US012791229B2

(12) United States Patent
Symons et al.

(10) Patent No.: US 12,791,229 B2
(45) Date of Patent: Nov. 10, 2026

(54) GEOTHERMAL COOLING SYSTEM

(71) Applicant: Solution Energy Technology, Inc., Houston, TX (US)

(72) Inventors: Matt Symons, Surry Hills (AU); Grant John Christie, Galgary (CA)

(73) Assignee: Solution Energy Technology, Inc., Houston, TX (US)

( * ) Notice: Subject to any disclaimer, the term of this patent is extended or adjusted under 35 U.S.C. 154(b) by 0 days.

(21) Appl. No.: 19/637,956

(22) Filed: Apr. 2, 2026

(65) Prior Publication Data

US 2026/0235328 A1 Aug. 13, 2026

Related U.S. Application Data

(62) Division of application No. 19/405,703, filed on Dec. 2, 2025.

(Continued)

(51) Int. Cl.
*F24T 50/00* (2018.01)
*F24T 10/17* (2018.01)

(Continued)

(52) U.S. Cl.
CPC .............. *F24T 50/00* (2018.05); *F24T 10/17* (2018.05); *F24T 10/20* (2018.05); *F24T 10/10* (2018.05); *F24T 10/40* (2018.05); *Y02E 10/30* (2013.01)

(58) Field of Classification Search
CPC ........... Y02E 10/30; F24T 50/00; F24T 10/40

(Continued)

(56) References Cited

U.S. PATENT DOCUMENTS 3,805,885 A 4/1974 Van
3,857,244 A 12/1974 Faucette (Continued)

FOREIGN PATENT DOCUMENTS

CN 112065521 A 12/2020
CN 113091335 A 7/2021

(Continued)

OTHER PUBLICATIONS

Akhmadullin, et al., "Design and Analysis of Electric Power Production Unit for Low Enthalpy Geothermal Reservoir Applications", International Journal of Earth, Energy and Environmental Sciences, vol. 8, No. 6, section II, Fig. 2, 2014, 448-454.

(Continued)

*Primary Examiner* — Joel M Attey
(74) *Attorney, Agent, or Firm* — Peacock Law P.C.; Marco H. Santamaria; Laura Ingersol

(57) ABSTRACT

A geothermal cooling system, the system comprising: a forced geothermal circuit in communication with a well bore; a heat exchanger; a cold reservoir fluid intake; and a reservoir return channel. A method for geothermal cooling, the method comprising: passing a hot working fluid into a forced geothermal circuit comprising a heat exchanger; passing a cold reservoir fluid from a reservoir through an intake; passing the cold reservoir fluid into the heat exchanger; reducing the temperature of the hot working fluid to form a cold working fluid; increasing the temperature of the cold reservoir fluid to form warm reservoir fluid; passing the cold working fluid into a cold surface closed loop; and passing the warm reservoir fluid into a reservoir return channel.

18 Claims, 24 Drawing Sheets

Related U.S. Application Data

(60) Provisional application No. 63/727,159, filed on Dec. 2, 2024.

(51) Int. Cl.
*F24T 10/20* (2018.01)
*F24T 10/10* (2018.01)
*F24T 10/40* (2018.01)

(58) Field of Classification Search
USPC .......... 165/45
See application file for complete search history.

(56) References Cited

U.S. PATENT DOCUMENTS

| | | | | |
|---|---|---|---|---|
| 3,874,174 | A | 4/1975 | Greene | |
| 4,043,129 | A | 8/1977 | McCabe | |
| 4,112,745 | A | 9/1978 | Mccabe et al. | |
| 4,201,060 | A | 5/1980 | Outmans | |
| 4,220,202 | A | 9/1980 | Aladiev et al. | |
| 4,223,729 | A | 9/1980 | Foster | |
| 4,492,083 | A | 1/1985 | Mccabe et al. | |
| 6,142,215 | A | 11/2000 | Paulsen et al. | |
| 7,011,154 | B2 | 3/2006 | Maher et al. | |
| 9,541,309 | B2 | 1/2017 | Colwell | |
| 11,441,394 | B1 | 9/2022 | Joshi et al. | |
| 11,585,330 | B1 | 2/2023 | David | |
| 11,708,818 | B1 | 7/2023 | Cook et al. | |
| 12,048,115 | B2 | 7/2024 | Cairone, Jr. | |
| 12,305,467 | B2 * | 5/2025 | Randolph | E21B 33/04 |
| 12,385,673 | B1 * | 8/2025 | Nielson | F01K 7/32 |
| 2006/0196668 | A1 | 9/2006 | Burge et al. | |
| 2010/0272515 | A1 | 10/2010 | Curlett | |
| 2012/0001429 | A1 | 1/2012 | Saar et al. | |
| 2013/0043678 | A1 | 2/2013 | Saar et al. | |
| 2015/0122453 | A1 | 5/2015 | Colwell | |
| 2015/0300327 | A1 | 10/2015 | Sweatman et al. | |
| 2020/0033070 | A1 | 1/2020 | Vlahinos et al. | |
| 2021/0025623 | A1 | 1/2021 | Holtzman | |
| 2021/0062682 | A1 | 3/2021 | Higgins et al. | |
| 2022/0018577 | A1 * | 1/2022 | Randolph | F24T 10/15 |
| 2022/0082091 | A1 | 3/2022 | Lu et al. | |
| 2022/0349286 | A1 | 11/2022 | Bowdon et al. | |
| 2022/0373230 | A1 | 11/2022 | Chorn et al. | |
| 2023/0242399 | A1 | 8/2023 | Al-qasim et al. | |
| 2023/0313652 | A1 | 10/2023 | Benson et al. | |
| 2024/0167461 | A1 | 5/2024 | Hogg | |
| 2024/0318872 | A1 | 9/2024 | Vestavik | |
| 2025/0116430 | A1 | 4/2025 | Christie et al. | |
| 2025/0198662 | A1 * | 6/2025 | Daprocida | F24T 10/17 |
| 2025/0257907 | A1 | 8/2025 | Christie et al. | |
| 2025/0362059 | A1 | 11/2025 | Christie et al. | |
| 2025/0377137 | A1 | 12/2025 | Christie et al. | |
| 2026/0153273 | A1 | 6/2026 | Symons et al. | |

FOREIGN PATENT DOCUMENTS

| | | | | |
|---|---|---|---|---|
| DE | 102020108518 | A1 | 9/2021 | |
| FR | 3099237 | A1 | 1/2021 | |
| JP | 57002943 | | 1/1982 | |
| JP | 2020112277 | A | 7/2020 | |
| JP | 7153978 | B1 | 10/2022 | |
| WO | 2012066403 | A1 | 5/2012 | |
| WO | 2018112610 | A1 | 6/2018 | |
| WO | 2019157341 | A1 | 8/2019 | |
| WO | 2022198336 | A1 | 9/2022 | |
| WO | 2022269305 | A1 | 12/2022 | |
| WO | WO-2023177871 | A1 * | 9/2023 | F24T 10/13 |
| WO | 2025074160 | A1 | 4/2025 | |
| WO | 2026120477 | A1 | 6/2026 | |

OTHER PUBLICATIONS

Alimonti, et al., "The wellbore heat exchangers: A technical review", Renewable Energy, vol. 123, Fig. 6-8, 2018, 353-381.

Gascuel, et al., "Design and optimization of deep coaxial borehole heat exchangers for cold sedimentary basins", Geothermics, vol. 105, 2022.

Mukhina, et al., "Enhanced Oil Recovery Method Selection for Shale Oil Based on Numerical Simulations", ACS Omega vol. 6, 2021, 23731-23741.

* cited by examiner

GEOTHERMAL COOLING SYSTEM

CROSS-REFERENCE TO RELATED APPLICATIONS

This application is a divisional application of U.S. patent application Ser. No. 19/405,703, entitled "Geothermal Cooling System", filed on Dec. 2, 2025, which claims priority to and the benefit of the filing of U.S. Provisional Patent Application No. 63/727,159 entitled "Geothermal Cooling System", filed on Dec. 2, 2024, and the specification thereof is incorporated herein by reference.

BACKGROUND OF THE INVENTION

Field of the Invention (Technical Field)

Embodiments of the present invention relate to a geothermal cooling system and method of geothermal cooling.

Background

Industrial processes often generate heat as a product. Geothermal heat generates heat to power turbines. Fluid flow into a geothermal system is governed in part by Darcy's law.

Geothermal systems often employ an organic Rankine cycle ("ORC") to generate power. Energy recovery depends on the temperature differential. ORC efficiency increases by increasing the differential. What is needed is a system and/or method that increases the temperature differential in an ORC.

Other industrial processes generate heat as a byproduct. Data centers require substantial energy input and generate excess heat that is dissipated by air or water cooling. Water-cooled heat centers produce heated fluid that must be cooled before being recycled into the data center. There is a present need for a system and/or method that effectively cools the heated fluid exiting the data center.

BRIEF SUMMARY OF EMBODIMENTS OF THE PRESENT INVENTION

Embodiments of the present invention relate to a geothermal cooling system, the system comprising: a forced geothermal circuit in communication with a well bore; a heat exchanger; a cold reservoir fluid intake; and a reservoir return channel. In another embodiment, the system further comprises a pump. In another embodiment, the pump comprises an electric submersible pump. In another embodiment, the system further comprises a thermosiphon.

In another embodiment, the heat exchanger comprises a well bore heat exchanger. In another embodiment, the well bore heat exchanger is a well bore gyroid heat exchanger. In another embodiment, the heat exchanger is at least partially disposed within the well bore. In another embodiment, the heat exchanger is in communication with an industrial system. In another embodiment, the system further comprises insulated tubing. In another embodiment, the heat reservoir return channel comprises a multilateral channel.

In another embodiment, the heat reservoir return channel comprises a toe perforation. In another embodiment, the system further comprises a landing packer. In another embodiment, the system further comprises a hydraulic driver. In another embodiment, the system further comprises a hot surface closed loop. In another embodiment, the system further comprises a cold surface closed loop. In another embodiment, the system further comprises a condenser.

Embodiments of the present invention also relate to method for geothermal cooling, the method comprising: passing a hot working fluid into a forced geothermal circuit comprising a heat exchanger; passing a cold reservoir fluid from a reservoir through an intake; passing the cold reservoir fluid into the heat exchanger; reducing the temperature of the hot working fluid to form a cold working fluid; increasing the temperature of the cold reservoir fluid to form warm reservoir fluid; passing the cold working fluid into a cold surface closed loop; and passing the warm reservoir fluid into a reservoir return channel. In another embodiment, the method further comprises passing the warm reservoir fluid into the reservoir. In another embodiment, the method further comprises conveying the hot working fluid and cold working fluid by thermosiphon effect. In another embodiment, the hot working fluid is passed from into the forced geothermal circuit comprising a heat exchanger from an industrial application.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
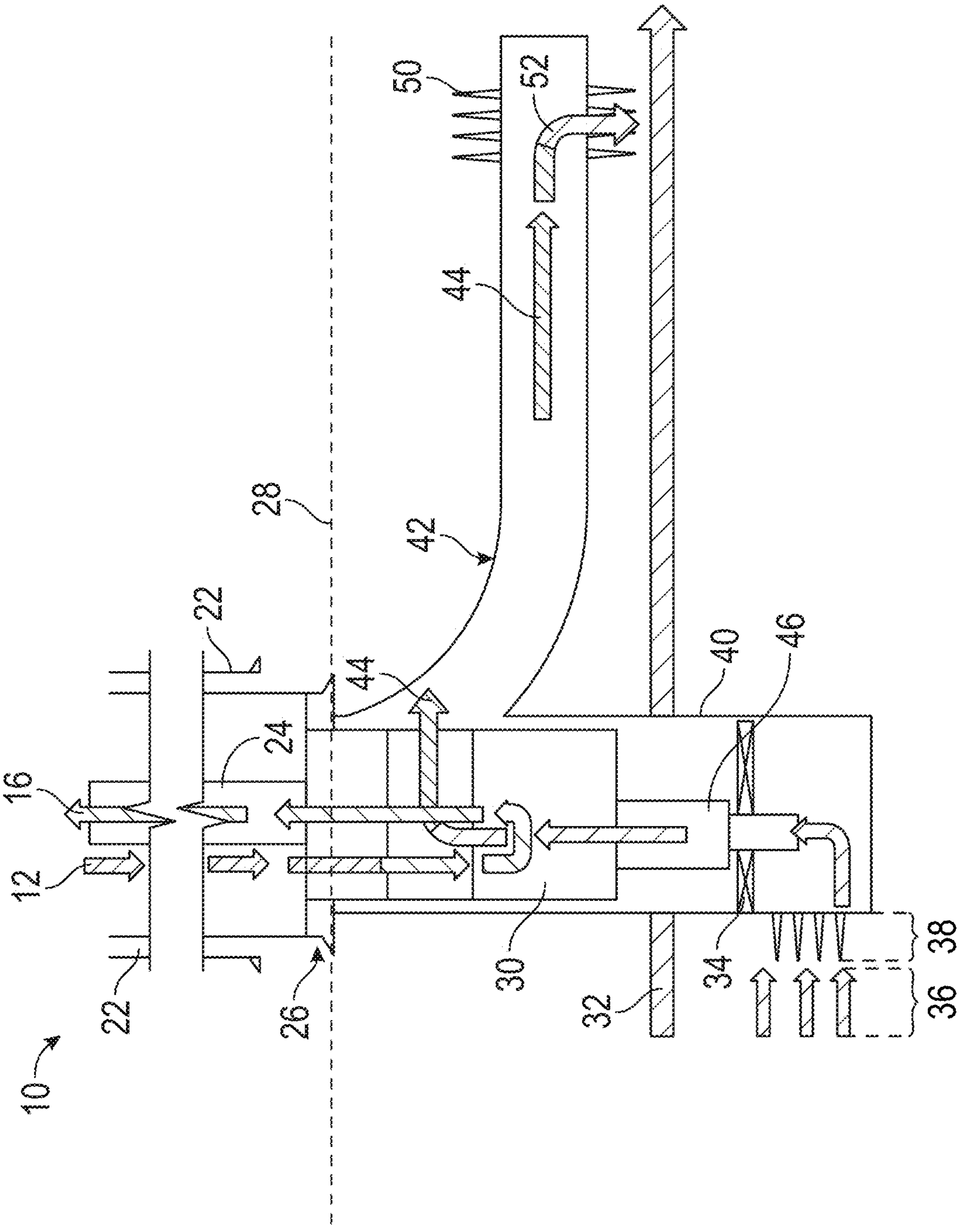
FIG. 1 is a diagram that illustrates a geothermal cooling system, according to an embodiment of the invention.

Embodiments of the present invention relate to a system for geothermal cooling, the system comprising: a forced geothermal circuit; a heat exchanger; an intake; and reservoir return channel. The system may further comprise a pump. The pump may comprise an electric submersible pump ("ESP"). The system may further comprise a thermosiphon. The heat exchanger may comprise a well bore heat exchanger. The heat exchanger may be at least partially disposed within a well bore. The system may further comprise insulation tubing. The system may further comprise a landing packer. The reservoir return channel may comprise a toe perforation. The system may be in communication with an industrial application. The intake port may be a cold reservoir fluid intake.

Embodiments of the present invention also relate to a method for geothermal cooling, the method comprising: passing a hot working fluid into a hot surface closed loop; passing the hot working fluid into a forced geothermal circuit comprising a heat exchanger; passing a cold reservoir fluid from a reservoir through an intake; pumping the cold reservoir fluid into the heat exchanger; reducing the temperature of the hot working fluid to form cold working fluid; increasing the temperature of the cold reservoir fluid to form warm reservoir fluid; passing the cold working fluid into a cold surface closed loop; passing the warm reservoir fluid into a reservoir return channel. The method may further comprise returning the warm reservoir fluid to the reservoir. The method may further comprising conveying the hot working fluid and/or cold working fluid by thermosiphon effect. The intake may be a cold reservoir fluid intake.

The term "thermosiphon effect" as used herein means movement fluid by passively circulating a fluid using natural convention and/or density differences.

The terms "forced geothermal circuit" or "FGC" as used herein refer a system for cooling a working fluid and comprise a heat exchanger, hot surface cold loop, and cold surface closed loop. The "forced geothermal circuit" or "FGC" may be disposed entirely or partially below the surface of the earth, i.e., the "forced geothermal circuit" or "FGC" may be sub-surface.

The term "well bore" as used herein means a hole in the ground to extract minerals from a mineral reservoir or generate geothermal heat.

The term "heat exchanger" as used herein means an apparatus to extract geothermal heat.

The term "closed loop system" as used herein means a geothermal heat generating system wherein a heat transfer fluid, e.g., circulation fluid, and/or thermal transfer fluid, is circulated in a closed loop from the surface to the target geothermal zone where the fluid heats up before being returned to the surface.

The terms "mineral" or "minerals" as used herein mean oil; bitumen; natural gas; oil sands; hydrocarbon; aqueous solution comprising a hydrocarbon; produced water; viscous heterogenous mixture; rock; stone; clay; metal, including but not limited to, a rare earth element, a base metal, a precious metal, a platinum group metal, or a combination thereof; sand; radioactive element; or a material or combination thereof.

The terms "working fluid" or "working fluids" as used herein mean a circulated fluid used in a thermodynamic process and may be subjected to heating, cooling, condensation, and/or expansion. The terms "working fluid" and "circulation fluid" are used interchangeably throughout the specification.

The terms "fluid" or "fluids" as used herein mean any liquid, aqueous solution, hydrocarbon, gas, or combination thereof.

The terms "organic Rankine cycle" or "ORC" as used herein mean a thermodynamic cycle using an organic fluid with a vaporization temperature lower than water.

Embodiments of the present invention may address the issues of heat inefficiencies in industrial applications including, but not limited to, data center geothermal systems using ORCs, chemical facilities, and/or processing facilities. The geothermal cooling system may circulate heated working fluid from a source (e.g., an industrial system) and reduce the temperature of the working fluid by flowing the working fluid through a heat exchange in proximity to a reservoir fluid that is at a lower temperature than the heated working fluid. The geothermal cooling system may comprise an FGC that may comprise and/or be used in combination with a heat exchanger, e.g., a well bore heat exchange ("WBHX") to force circulation of the surrounding cool reservoir fluid between the WBHX and a surrounding matrix containing a heated working fluid. One or more proximate well bores may be drilled in a stacked configuration. A pump may be used to convey fluid between the FGC well and the annulus space surrounding the heat exchanger to increase and/or improve the source heat extraction into a reservoirs area. The FGC may improve the economics for a system by allowing efficient cooling of the industrial system.

The geothermal cooling system may increase an ORC efficiency by at least 15% and/or may reduce required thermal load recovery by at least 60%. The geothermal cooling system may reduce direct information technology and/or server cooling load in a data center. The geothermal cooling system may improve ORC performance and/or geothermal power recovery; improve combined cycle power station efficiency; and/or provide direct cooling for industrial application.

The geothermal cooling system may cool the expander outlet temperature on an ORC. Cooling efficiency depends on factors including, but not limited to, the working fluid; the temperature of the heat source; and the degree of cooling applied. A general relationship between cooling and efficiency improvement may be determined using thermodynamic principles. The basic thermodynamic relationship is based on the Carnot efficiency. The theoretical maximum efficiency of any thermodynamic cycle is given by the Carnot efficiency, which is defined by Equation (1):

$$\eta_{Carnot} = 1 - T_{cold}/T_{hot} \tag{1}$$

Where:

$T_{hot}$ is the temperature of the heat source (in absolute terms, usually Kelvin).

$T_{cold}$ is the temperature of the heat sink (condenser or expander outlet temperature, in Kelvin).

The theoretical efficiency increases when the expander outlet temperature ($T_{cold}$) is lowered and the temperature difference between the heat source and sink increases.

Efficiency Gain may be approximated for real ORC systems. For real (real world) ORC systems, the efficiency increase is typically lower than the Carnot limit due to irreversibility in the cycle, but one can expect an efficiency improvement of about 0.2% to 0.5% per 1° C. reduction in expander outlet temperature. For example, assume the following:

Heat source temperature: $T_{hot}$=150° C.=423 K

Expander outlet temperature: $T_{cold}$=60° C.=333 K

Cooling effect: Reducing expander outlet by 10° C. to 50° C.

Using the Carnot efficiency formula (Equation 1) before and after cooling:

$$\eta_{initial} = 1 - 333\ K/423\ K = 21.3\%$$

$$\eta_{cooled} = 1 - 323\ K/423\ K = 23.6\%$$

This shows a 2.3% increase in theoretical maximum efficiency by cooling the expander outlet by 10° C.

A typical efficiency increase in real ORC systems may be determined. Real-world ORC systems operate at a lower efficiency than the Carnot limit, often achieving about 50% to about 70% of the theoretical maximum efficiency due to irreversibility, friction, heat losses, etc. Therefore, if a system initially has an efficiency of about 10% to about 15%, a similar 10° C. cooling may result in an efficiency increase of about 0.5% to about 1.5%, depending on the fluid and system design.

Different working fluids may be used to achieve cooling. The working fluid may comprise a higher critical temperature fluid including, but not limited to, toluene, cyclohexane, or a combination thereof. The higher critical temperature fluid, with a higher operating temperature for the process, may achieve a more efficient energy recovery from cooling. A 10° C. reduction may improve efficiency by 1% or more due to their higher operating temperatures and better heat recovery potential.

The working fluid may comprise a lower critical temperature fluid including, but not limited to, a hydrofluorocarbon (e.g., R245fa, R134a, or a combination thereof). The lower critical temperature fluid result in smaller improvements relative to a higher critical temperature fluid (closer to 0.5% per 10° C. reduction), as their operating ranges are more constrained by their critical points.

The overall gain from cooling may be nonlinear. At higher temperatures, cooling has a greater impact because the efficiency is more sensitive to changes in temperature. As the expander outlet temperature approaches the ambient or coolant temperature, further cooling becomes less effective and may have diminishing returns.

For low to moderate temperature ORC systems (e.g., 100° C. to 200° C. sources) about 0.2% to about 0.5% efficiency improvement per ° C. of cooling may be achieved. For high-temperature ORC systems (e.g., 300° C. sources), the benefit may be slightly higher, and may be about 0.3% to about 0.6% per ° C. The maximal cooling benefit may be reached when the expander outlet temperature is reduced without excessive cooling system penalties (such as increased condenser size or power consumption).

Cooling the expander outlet temperature in an ORC system may yield efficiency gains in the range of about 0.2% to about 0.5% per 1° C. reduction, depending on the working fluid and the operating conditions. The higher the working fluid's critical temperature and the heat source temperature, the greater the efficiency improvement will be.

The geothermal cooling system may be disposed into a shallow well to access cooling reservoir fluid. Small well configurations compared to traditional geothermal heating systems may be used because of higher porosity and/or permeability in shallow well. The geothermal cooling system may be smaller than a traditional geothermal heating system due to efficiency of direct thermal heat application.

The geothermal cooling system may be operated in a target geology. The geothermal cooling system may be operated sub-potable horizons to avoid surface interactions and minimize permitting and/or community concerns. The geothermal cooling system may be operated in a high-permeability mobile aquifer to minimize short circuit cross flow and/or regional aquifer flow settings. The geothermal cooling system may be reservoir agnostic and may operate in the presence of clastic and/or carbonates.

The geothermal cooling system may be configured to minimize and/or avoid faulting. Down dip production and up dip injection within the same reservoir package may be employed to avoid reservoir depletion.

Turning now to the figures, FIG. 1 shows geothermal cooling system 10. Geothermal cooling system 10 comprises well bore casing 22, insulated tubing 24, landing packer 26 disposed above surface 28, well bore heat exchanger ("WBHX") 30, electric submersible pump ("ESP") 46, reservoir intake 38, production liner 40, reservoir return channel 42, and toe perforations 50. Hot working fluid passes through hot surface closed loop 12 and into WBHX 30 disposed in production liner 40. Cold reservoir fluid 36 from reservoir 32 enters reservoir intake 38 and is conveyed by ESP 46 into WBHX 30. Hot working fluid and cold reservoir fluid 36 exchange heat and hot working fluid is converted to cold working fluid which is then passed into cold surface closed loop 16. Cold reservoir fluid 36 is converted into warm reservoir fluid 44 which passes through reservoir return channel 42 before mixing with reservoir 32 to form mixed reservoir fluid 52, which returns to reservoir 32 by passing out of toe perforations 50.

Figure 2:
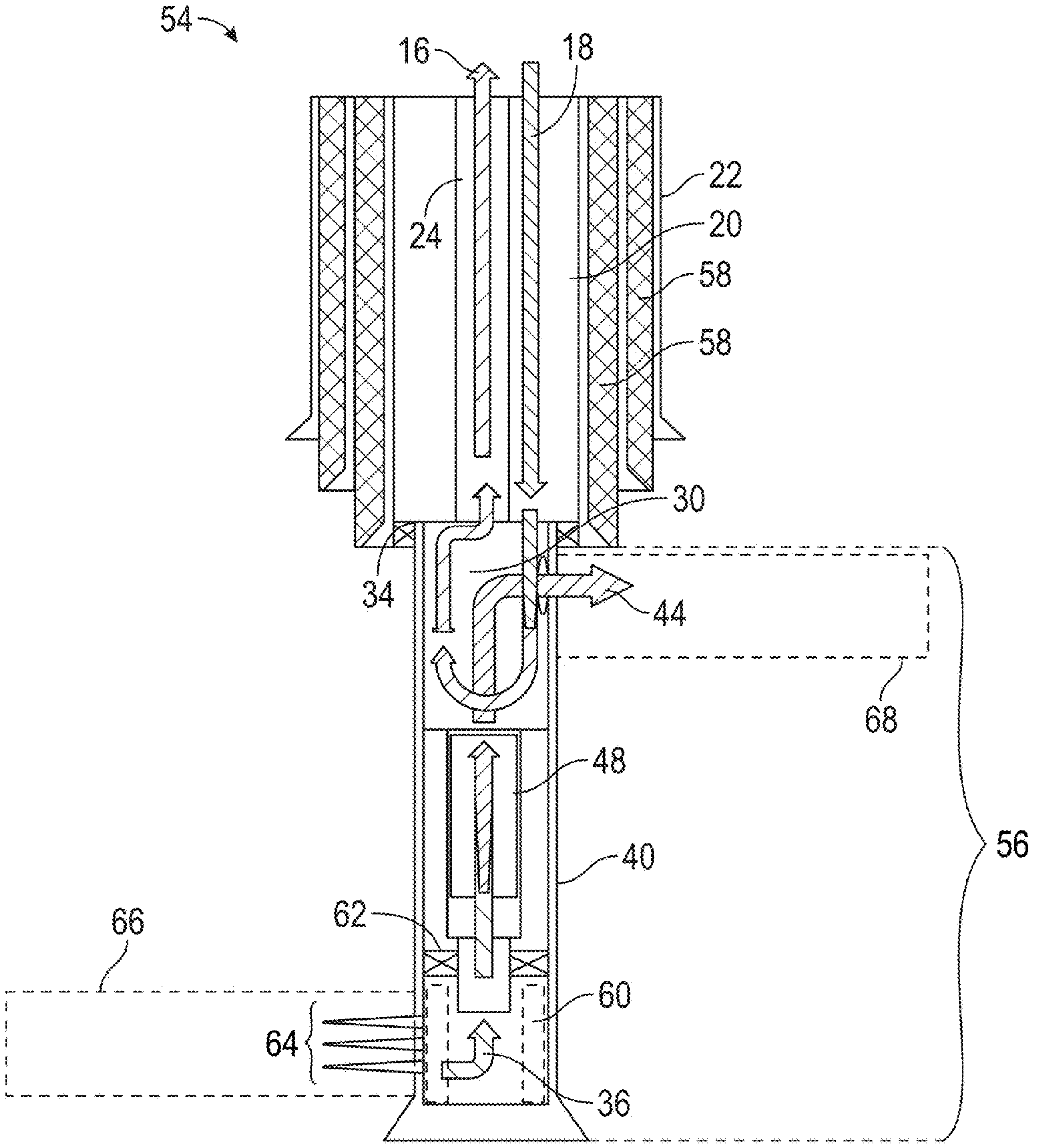
FIG. 2 is a diagram that illustrates a geothermal cooling system comprising a multilateral set forced geothermal circuit ("FGC"), according to an embodiment of the invention.

FIG. 2 shows geothermal cooling system 54 comprising a multilateral set FGC. Geothermal cooling system 54 comprises well bore casing 22, insulated tubing 24, landing packer 34, high heat transfer cement 58 disposed between layers of well bore casing 22, WBHX 30, ESP coupled with WBHX 48, production liner 40, lower packer 62 for ESP intake from perforations and/or an intake multilateral, multilateral slotted liner and/or gravel pack 60, perforation intakes 64, multilateral intake 66, and multilateral return 68. Hot working fluid 18 passes through annulus and/or separate dule completing conduit 20 into WBHX 30. Cold reservoir fluid 36 enters perforation intakes 64 and/or multilateral intake 66 and is conveyed into ESP coupled with WBHX 48. Hot working fluid 18 and cold reservoir fluid 36 exchange heat and hot working fluid 18 is converted to cold working fluid which is then passed into cold surface closed loop 16. Cold reservoir fluid 36 is converted into warm reservoir fluid 44 which passes into multilateral return 68. The True Vertical Depth ("TVD") may be selected based on reservoir temperature and/or properties. Upper well bore 56 may be vertical or deviated to accommodate multilateral design and reservoir targets. Flow directions indicated are nominal and may be reversed to optimize reservoir performance.

Figure 3:
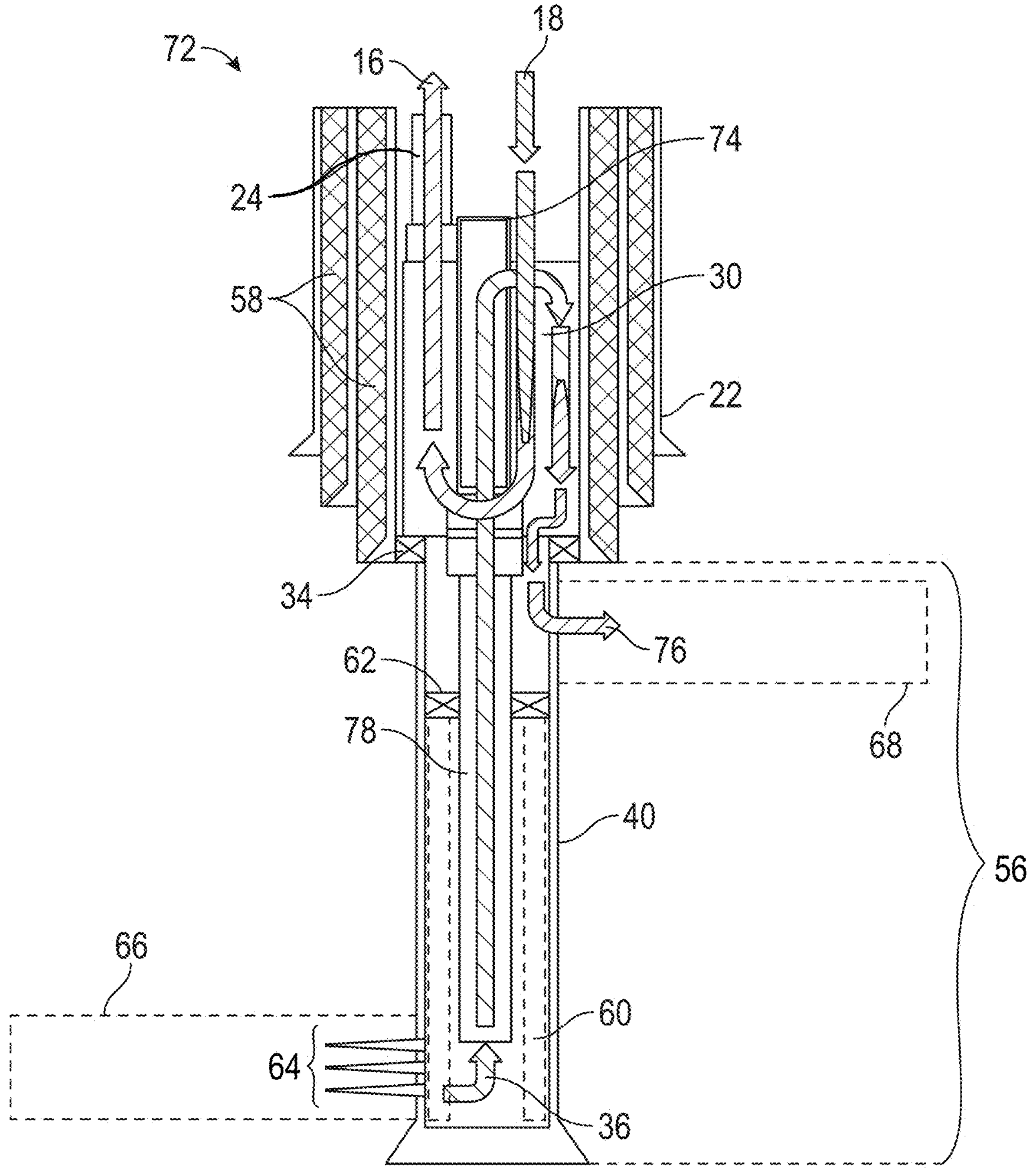
FIG. 3 is a diagram that illustrates a geothermal cooling system comprising a production set FGC, according to an embodiment of the invention.

FIG. 3 shows geothermal cooling system 72 comprising a production set FGC. Geothermal cooling system 72 comprises well bore casing 22, insulated tubing 24, landing packer 34, high heat transfer cement 58 disposed between layers of well bore casing 22, WBHX 30, production liner 40, lower packer 62 for ESP intake from perforations and/or a intake multilateral, multilateral slotted liner and/or gravel pack 60, perforation intakes 64, multilateral intake 66, multilateral return 68, mounted ESP 74, and down bore tubing 78. Mounted ESP 74 is disposed above or within WBHX 30 and may be separately retrieved for maintenance. Hot working fluid 18 passes into WBHX 30. Cold reservoir fluid 36 enters perforation intakes 64 and/or multilateral intake 66 and is conveyed by mounted ESP 74 through down bore tubing 78 into WBHX 30. Hot working fluid 18 and cold reservoir fluid 36 exchange heat and hot working fluid 18 is converted to cold working fluid which is then passed into cold surface closed loop 16. Cold reservoir fluid 36 is converted into warm reservoir fluid 76 which passes into multilateral return 68. The TVD may be selected based on reservoir temperature and/or properties. Upper well bore 56 may be vertical or deviated to accommodate multilateral design and reservoir targets. Flow directions indicated are nominal and may be reversed to optimize reservoir performance.

Figure 4:
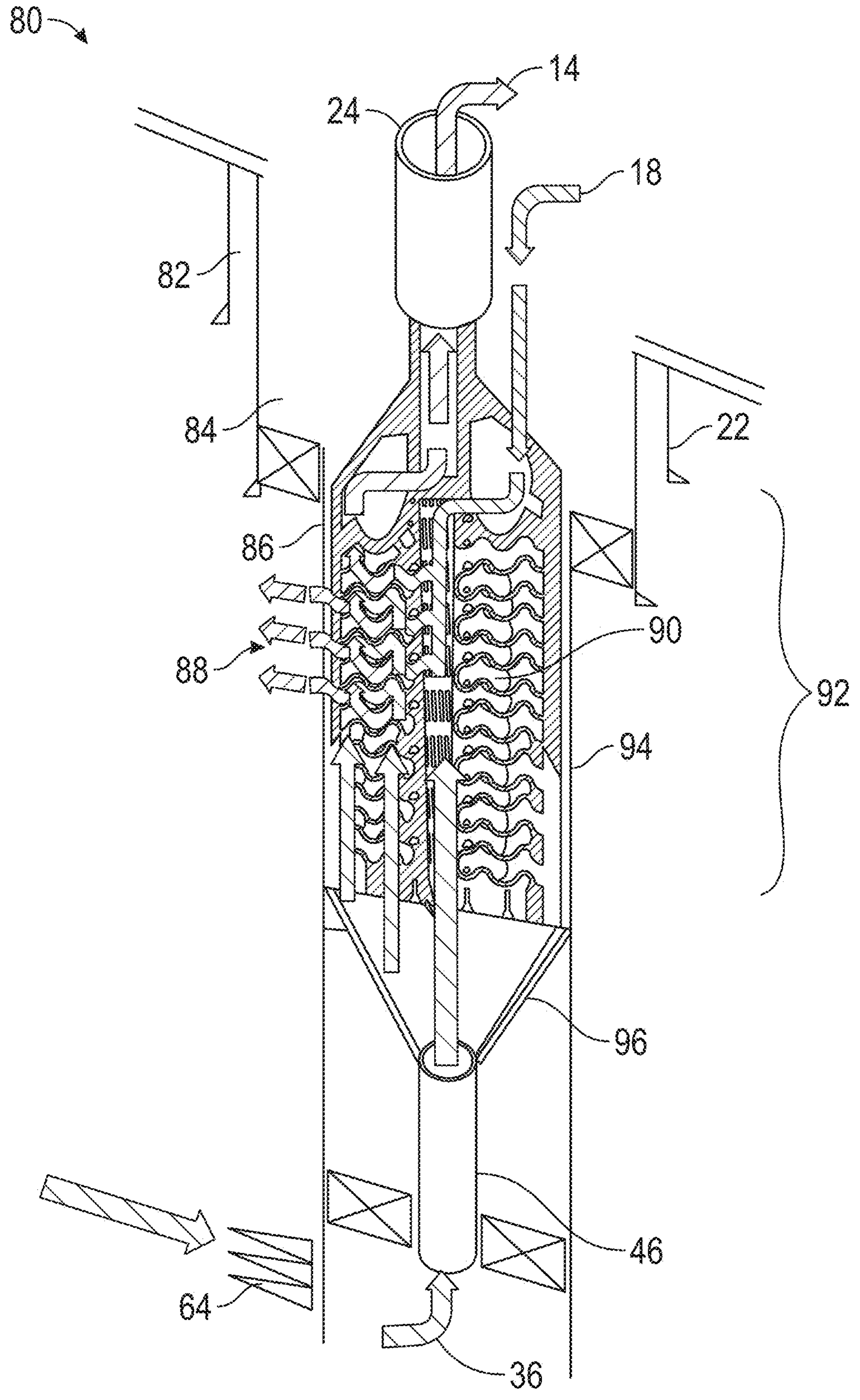
FIG. 4 is a diagram that illustrates a geothermal cooling system comprising a triple propagating minimal structure ("TPMS"), according to an embodiment of the invention.

FIG. 4 shows geothermal cooling system 80 comprising triple propagating minimal structure 90. Geothermal cooling system 80 comprises well bore casing 22, insulated tubing 24, well bore gyroid head exchanger ("WBGHX") 92, section casing 94 comprising side exit channel 86, thermosyphon 96, ESP 46, and perforation intakes 64. Well bore casing 22 forms annulus 82 and annulus 84. Annulus 82 is configured to receive high heat transfer cement. Annulus 84 is configured to receive hot working fluid 18. Side exit channel 86 allows fluid to return to a reservoir. Well bore gyroid head exchanger 92 comprises radial channels and is optimized for minimum pressure drop and for a counter current heat exchange configuration. WBGHX porting and internal configurations vary based on casing configuration and reservoir parameters. WBGHX may be disposed uphole in the larger casing sections, with fluid flow enhanced with an ESP or thermosiphon depending on requirements. Thermosyphon 96 provides reservoir drawdown and cross flow of cold reservoir fluid 36. Perforation intakes 64 reduce the temperature of cold reservoir fluid 36 before cold reservoir fluid 36 passes through ESP 46. Cold reservoir fluid 36 and hot working fluid 18 exchange heat to form cold working fluid 14 and warm reservoir fluid 88. Cold working fluid 14 may be returned for an ORC or direct utility service, e.g., in a data center. Warm reservoir fluid 88 may be returned to the reservoir via a multilateral channel or direct sidewall perforation.

Figure 5:
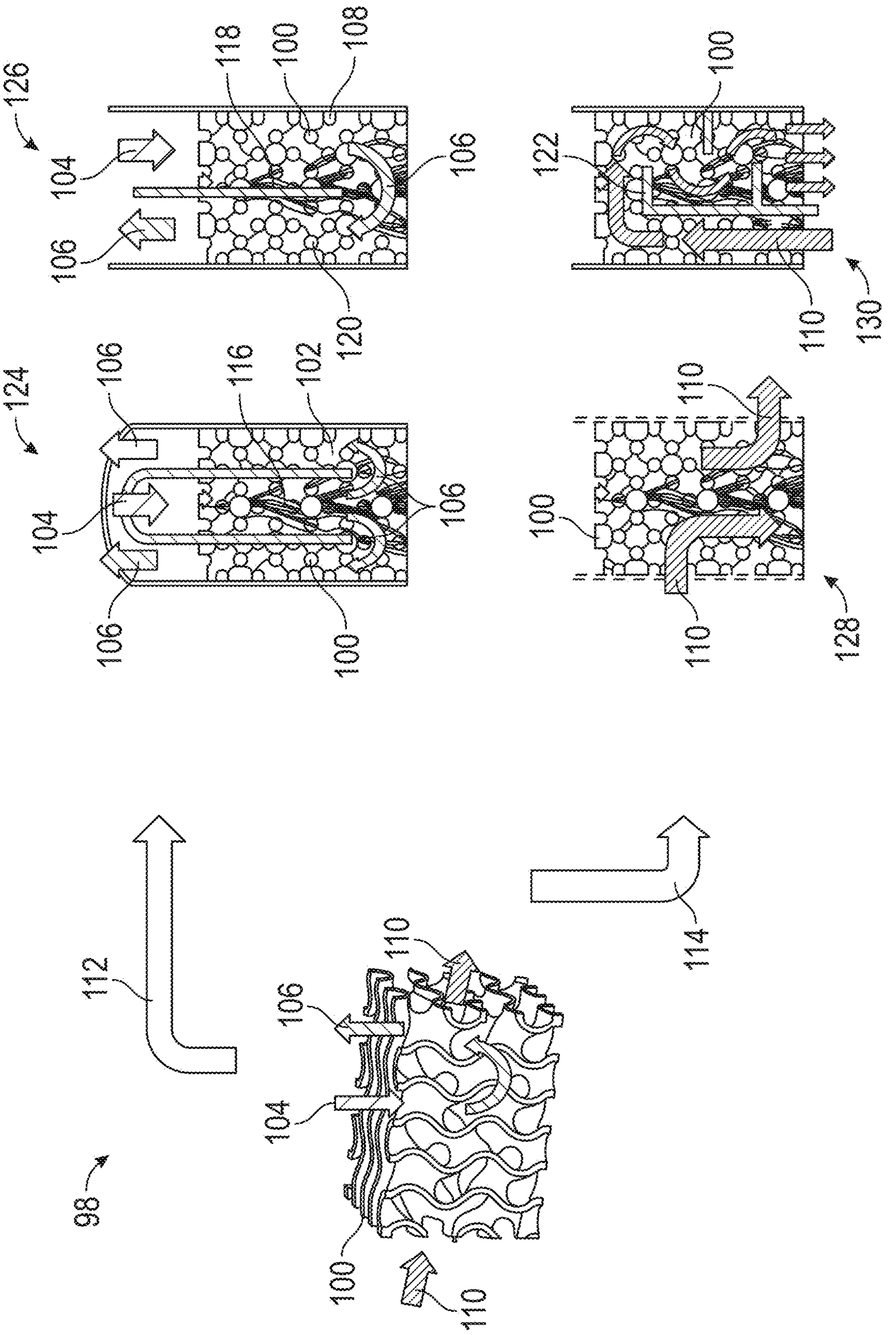
FIG. 5 is a series of diagrams that illustrate reservoir flow paths for working fluid to pass through a TPMS matrix, according to an embodiment of the invention.

FIG. 5 shows reservoir flow paths 98. Hot working fluid 104 passes through TPMS matrix 100 to reservoir fluid 110 and form cooled working fluid 106. TPMS internal structures support unique multi paths within the same TPMS matrix allowing simultaneous optimization for both reservoir and surface loops. Cooled working fluid 106 flows out of TPMS matrix 100 to surface loop flow path options 112. Reservoir fluid 110 flows out of TPMS matrix channels 100 to reservoir flow path options 114.

Engineered internal surface loop flow paths optimize pressure drop and heat transfer efficiency. Surface loop flow path options 112 include, but are not limited to, core and annulus path 124 and U path 126, helix, single pass, cross flow configurations, or combinations thereof. In core and annulus path 124, hot working fluid 104 enters core 116 and is converted to cooled working fluid 106. Cooled working fluid 106 flows around core 116 and enters annulus 102. In U path 126, hot working fluid 104 enters region 108 and is converted to cooled working fluid 106. Cooled working fluid 106 flows around barrier 118 and enters region 120.

Engineered internal reservoir fluid flow paths optimize pressure drop and heat transfer efficiency. Reservoir flow path options 114 include, but are not limited to, core and annulus path, U path, helix, single pass, cross flow path 128, combination U and helix path 130, or combinations thereof. In combination U and helix path 130, reservoir fluid 110 flows around barriers 122.

Figure 6:
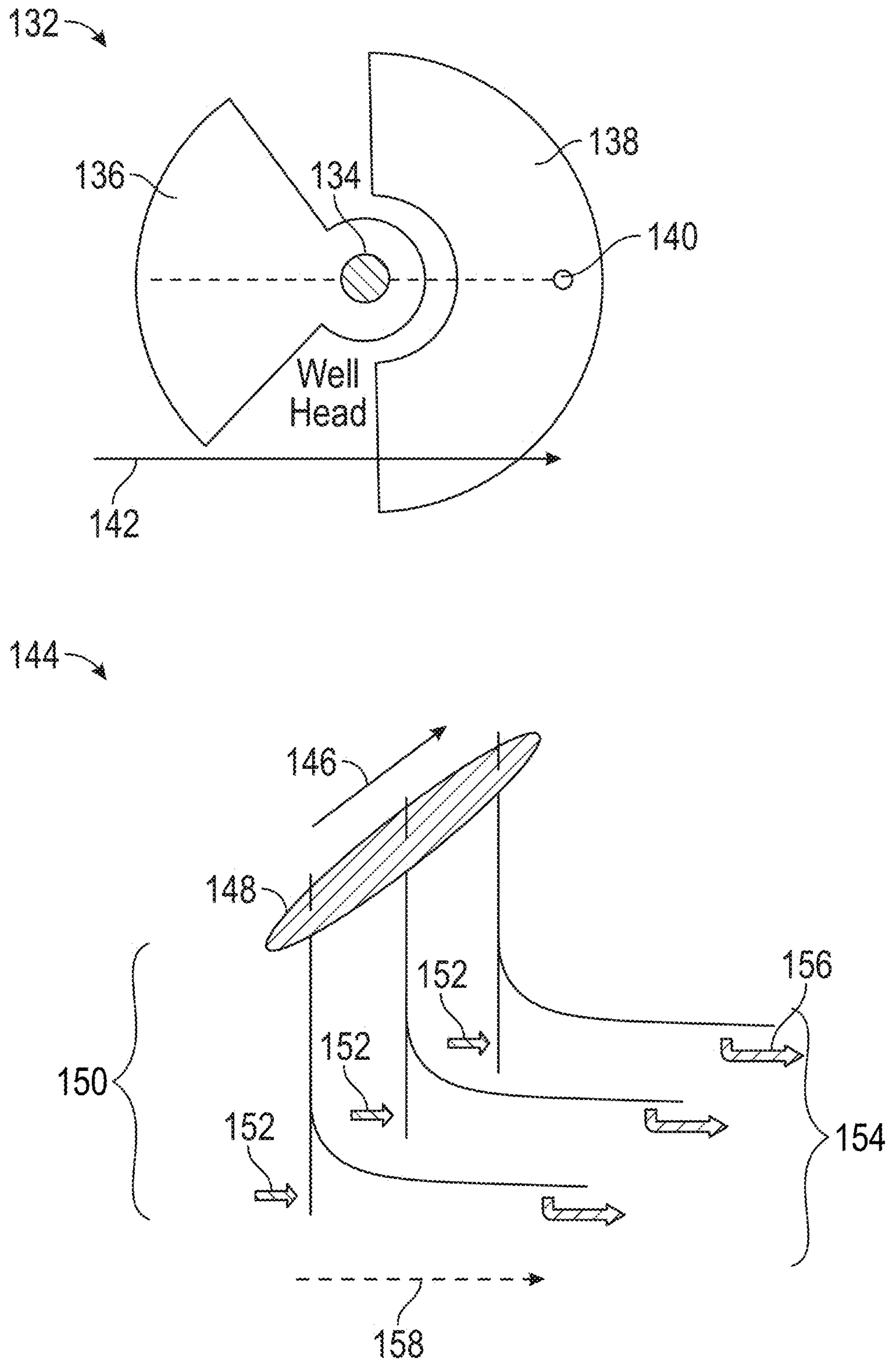
FIG. 6 is a series of diagrams that illustrate top and isometric views of reservoir fluid flow paths through geothermal cooling systems, according to an embodiment of the invention.

FIG. 6 shows top view 132 and isometric view 144 of reservoir fluid flow paths through geothermal cooling systems. Top view 132 shows well head 134, reservoir intake zone for perforations and or multilateral(s) 136, injection zone for return multilateral(s) 138, multilateral legs 140, and reservoir fluid migration direction 142. Isometric view 144 shows surface 148, surface well heads 146, plurality of vertical well legs 150, reservoir intake 152, region reservoir migration direction 158, reservoir intakes 152, reservoir return channels 154 and S-FGC return injection 156. The geothermal cooling wells can be deployed as an array spaced to maximize the available aquifer flow and to minimize interference between the individual wells. The intakes are intended to be located upstream of the aquifer flow direction and injected down-stream. Multiple wells can be deployed across the flow of the aquifer and or at differing depths and within different state to maximize the available cooling potential from the resource.

Figure 7A:
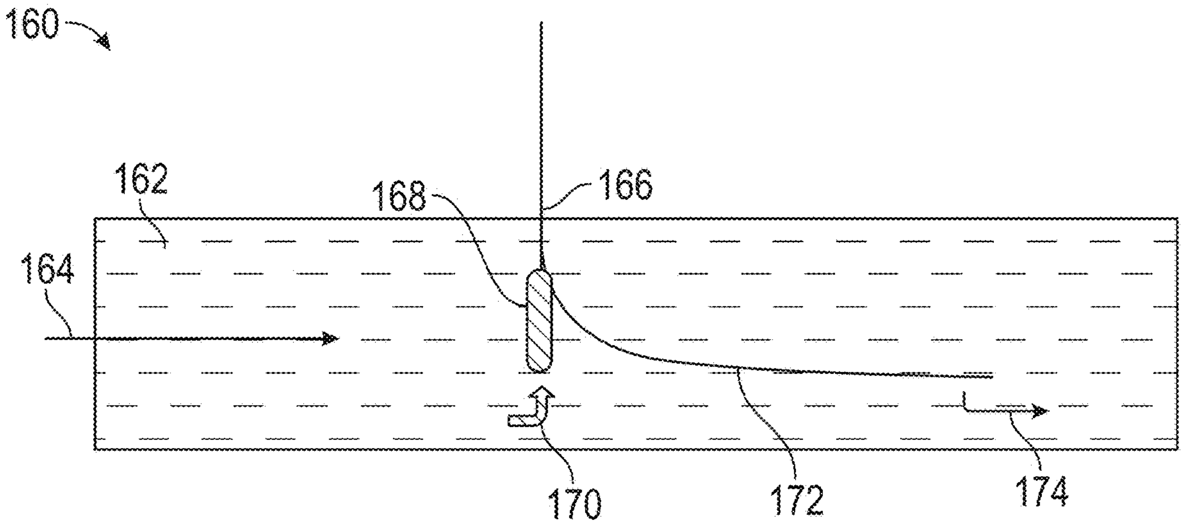
FIGS. 7A, 7B, 7C, 7D, 7E, and 7F are a series of diagrams that illustrate multilateral configurations for a geothermal cooling system, according to an embodiment of the invention.

FIGS. 7A, 7B, 7C, 7D, 7E, and 7F show multilateral configurations for a geothermal cooling system. FIG. 7A shows configuration 160 comprising reservoir 162, reservoir fluid migration direction 164, well bore 166, electric submersible pump-forced geothermal circuit-heat exchanger ("ESP-FGC-HX") unit 168, ESP intake 170, reservoir return channel 172, reservoir return flow 174. Configuration 160 shows a vertical well with a forced geothermal circuit-heat exchanger ("FGC-HX") and an inlet ESP located in the vertical toe. Reservoir return is via multilateral(s) oriented to aligned with regional aquifer migration. Injection of reservoir fluid is achieved via toe perforations, open hole, or auxiliary ESP in the multilateral to enhance injection rates.

Figure 7B:
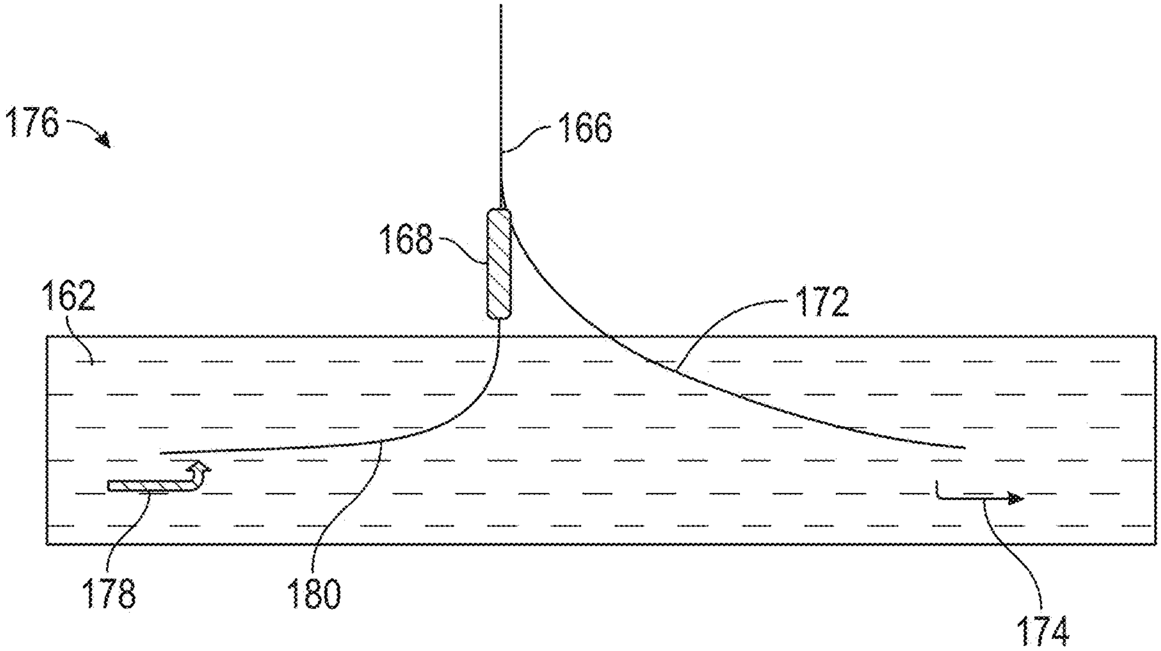

FIG. 7B shows configuration 176 comprising reservoir 162, well bore 166, ESP-FGC-HX unit 168, ESP intake 178, intake multilateral channel 180, reservoir return channel 172, reservoir return flow 174. Configuration 176 shows a vertical well with FGC-HX located above the intake and return multilaterals. Isolated multilateral design allows greater separation from inlet to reservoir return. An ESP is located on or in intake and or return multilaterals.

Figure 7C:
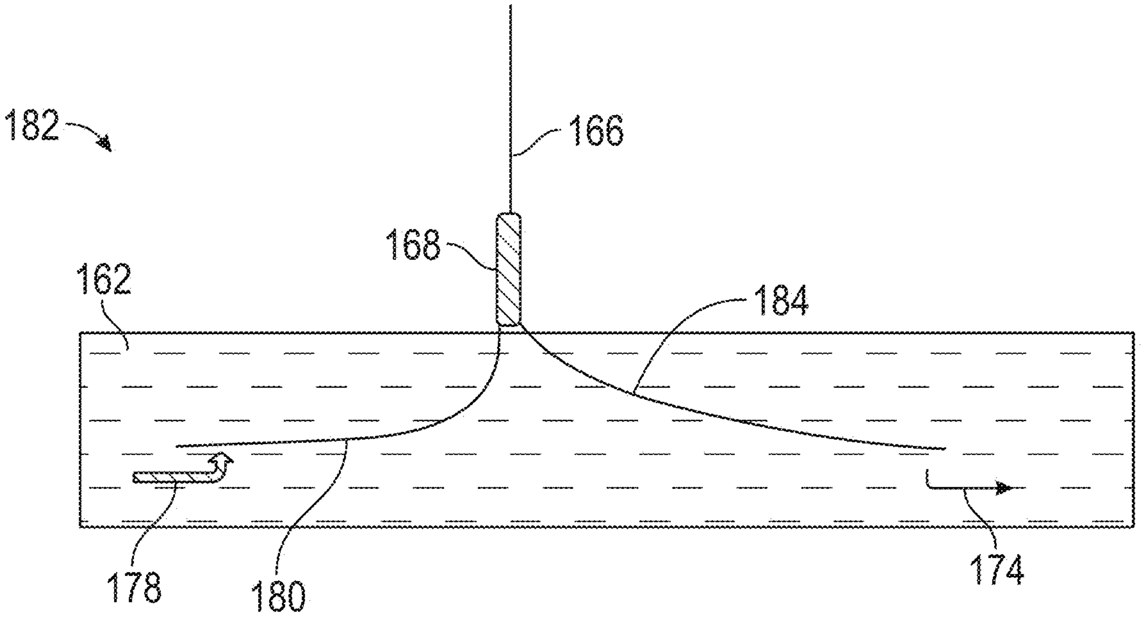

FIG. 7C shows configuration 182 comprising reservoir 162, well bore 166, ESP-FGC-HX unit 168, ESP intake 178, intake multilateral channel 180, reservoir return channel 184, reservoir return flow 174. Configuration 182 shows a vertical well with FGC-HX located above the multilaterals. Isolated multilateral design allows greater separation from inlet to reservoir return. An ESP is located on or in intake and or return multilaterals.

Figure 7D:
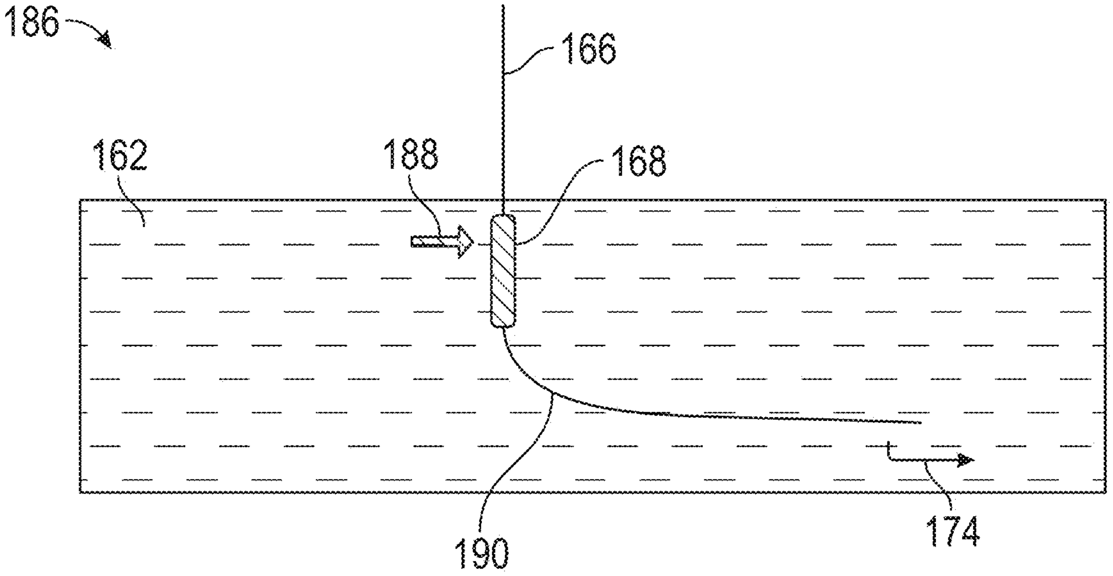

FIG. 7D shows configuration 186 comprising reservoir 162, well bore 166, ESP-FGC-HX unit 168, ESP intake 188, reservoir return channel 190, reservoir return flow 174. Configuration 186 shows a vertical well with an FGC-HX located above the reservoir return multilateral. An ESP is disposed above the FGC-HX with direct sidewall perforation or multilateral source.

Figure 7E:
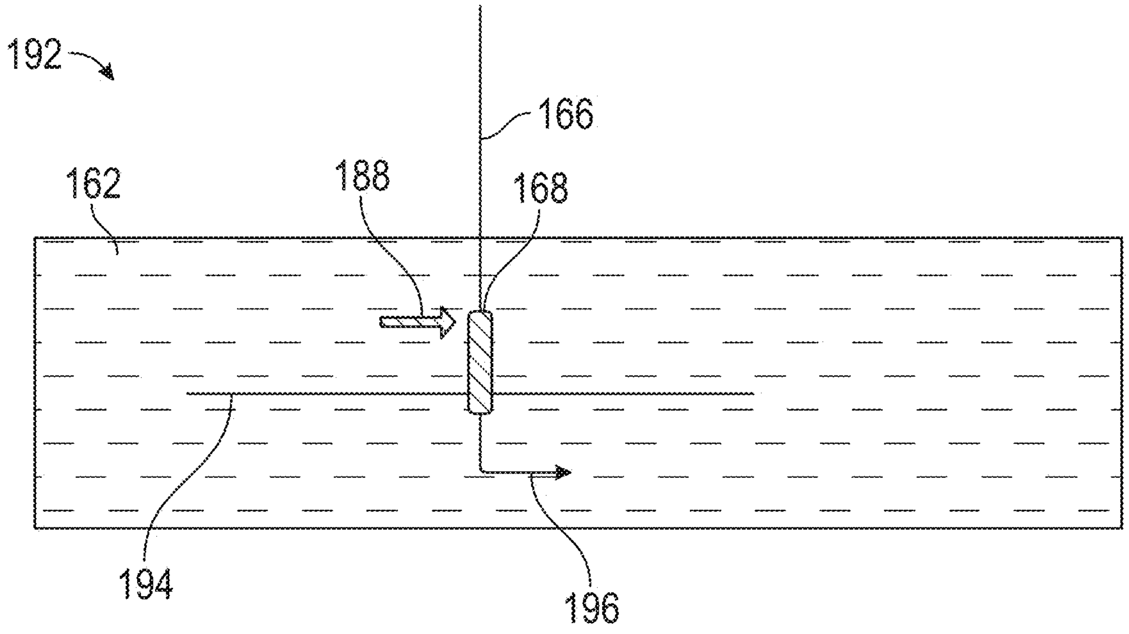

FIG. 7E shows configuration 192 comprising reservoir 162, well bore 166, ESP-FGC-HX unit 168, ESP intake 188, intake multilateral channel 180, reservoir return flow 196, and horizontal lens 194. Configuration 192 shows a direct sidewall intake and reservoir return without multilaterals for reservoirs with thin localized horizontal lens that form natural vertical barriers to limit short circuiting.

Figure 7F:
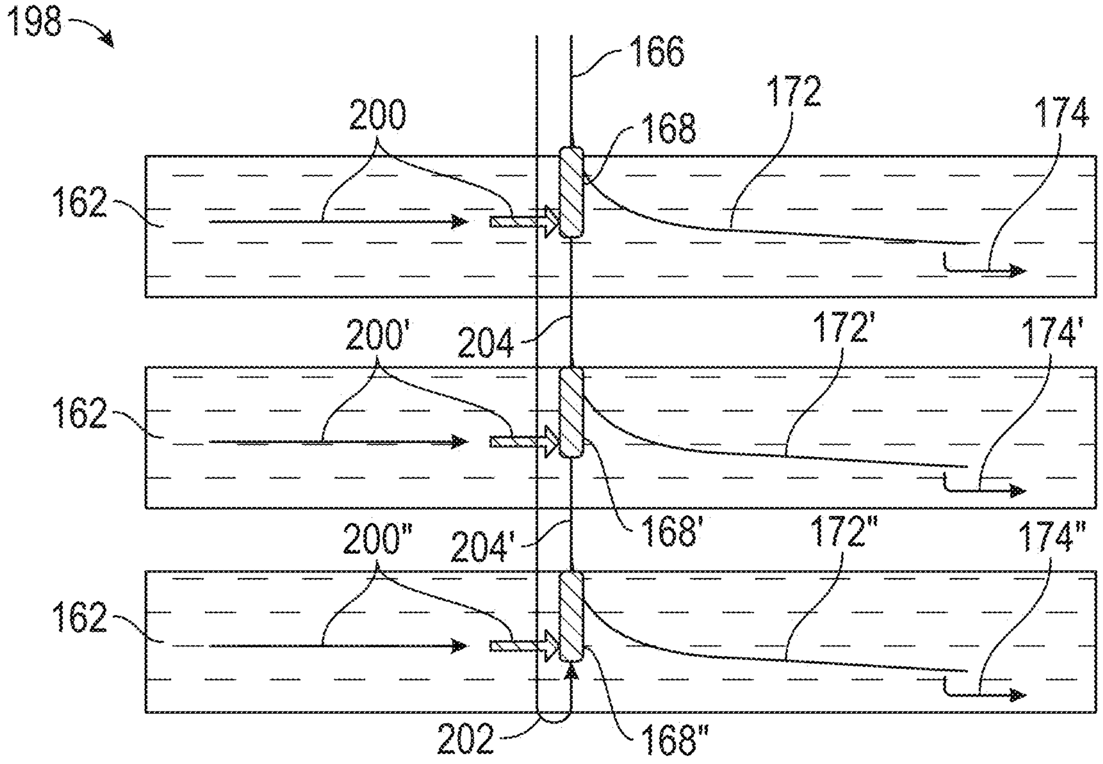

FIG. 7F shows configuration 198 comprising reservoir 162, well bore 166, FGC-HX units 168, 168', and 168", well bore sections 204 and 204', reservoir fluid migration directions 200, 200', and 200", reservoir return channels 172, 172', and 172", reservoir return flows 174, 174', and 174", and surface load (e.g., hot working fluid) 202. Configuration 198 shows a multi-stacked FGC allowing surface loads to be matched to available geological capacity and to minimize surface return temperatures. Configuration 198 may be achieved in a single well or in multiple wells in a cluster. Multilateral and FGC configurations may vary by horizon to account for geological constraints and optimization of energy exchange.

Figure 8:
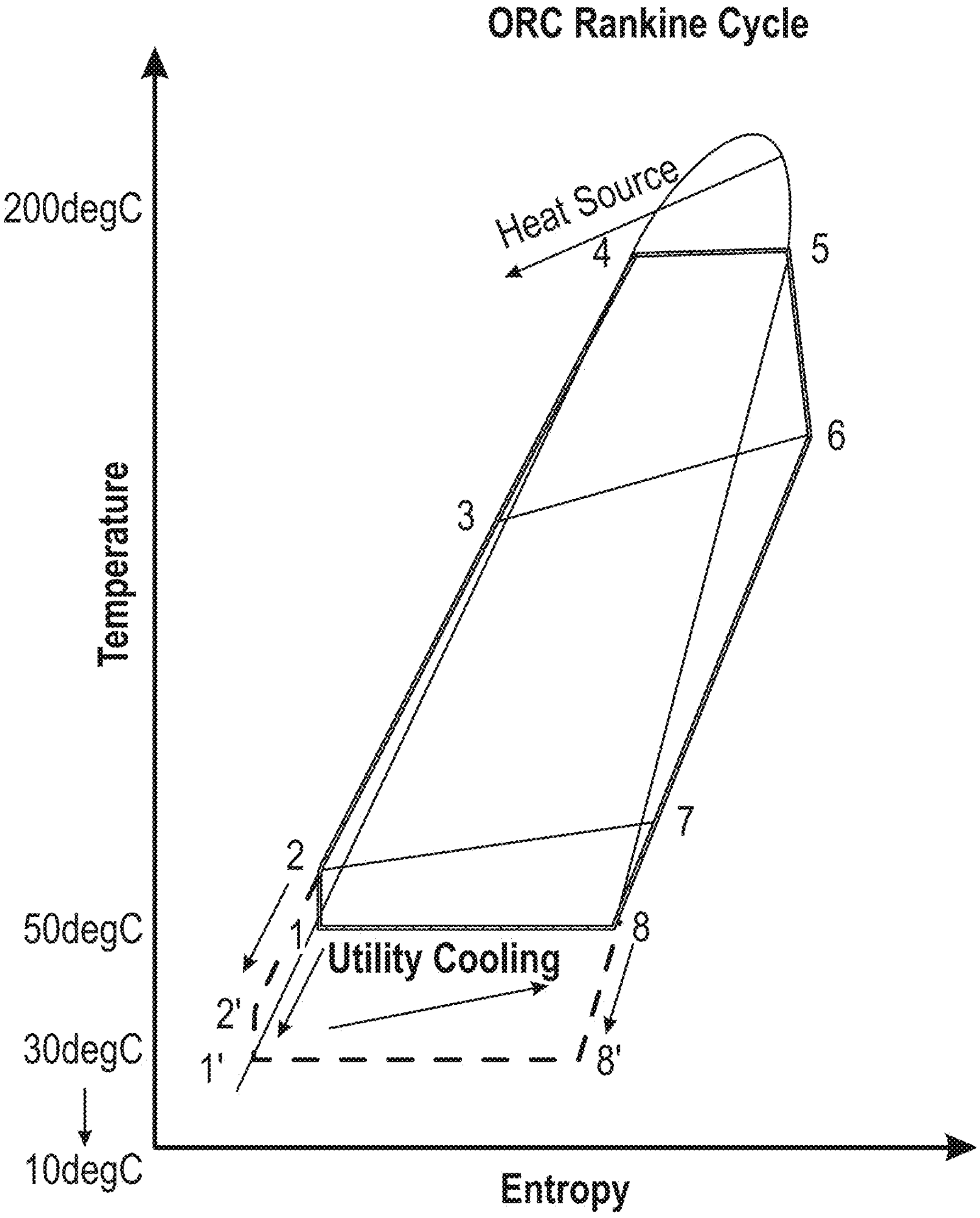
FIG. 8 is a graph that illustrates an ORC with a geothermal cooling system, according to an embodiment of the invention.

FIG. 8 shows an ORC with a geothermal cooling system. The geothermal cooling system lowers the minimum temperature of the ORC and increases the temperature differential to achieve greater energy recovery. The addition of the geothermal cooling system results in an efficiency gain of about 0.2% to about 0.5% per degree Celsius (° C.) drop in cooling temperature.

Figure 9:
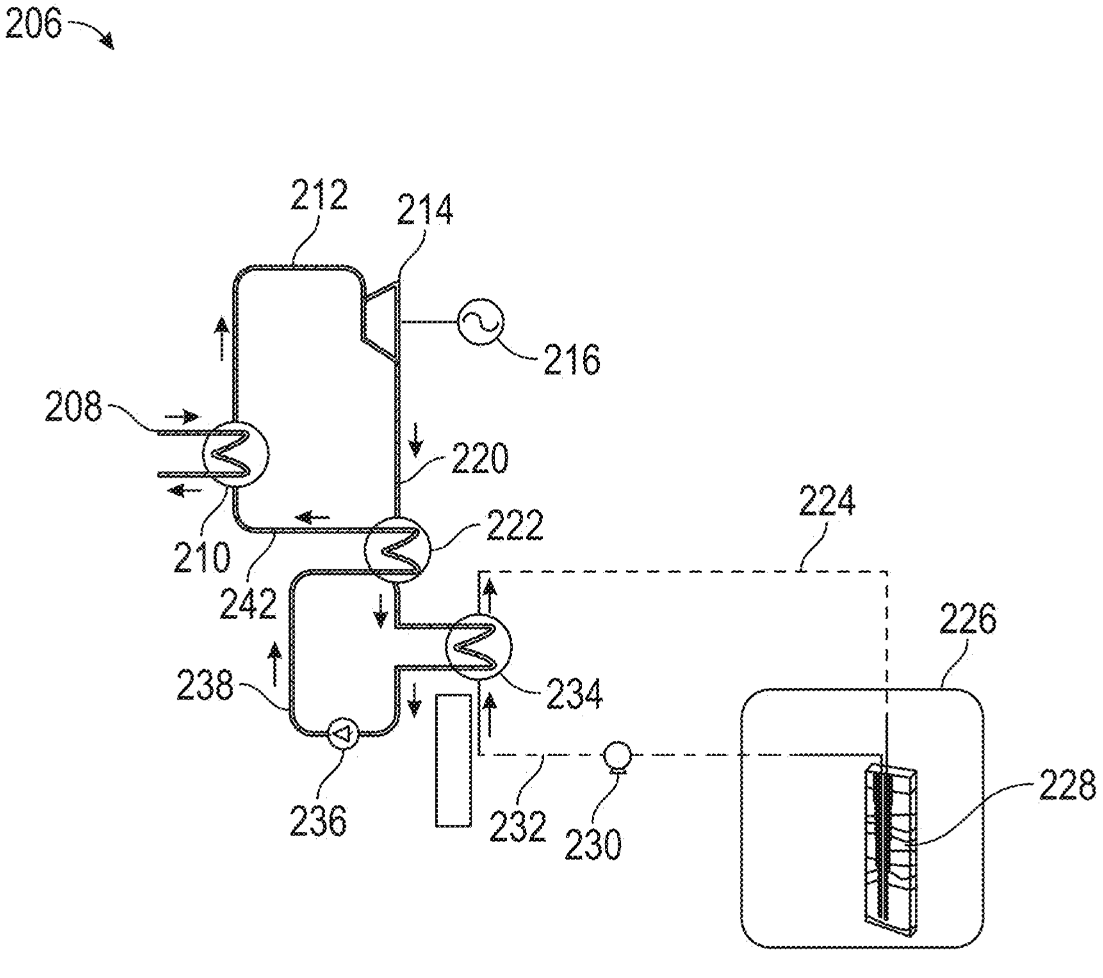
FIG. 9 is a diagram that illustrates an ORC process with a geothermal cooling system, according to an embodiment of the invention.

FIG. 9 shows ORC process 206 comprising geothermal cooling system 226. Heat source 208 heats evaporator 210 to produce fluid (e.g., steam) flow 212. Fluid flow 212 power turbine 214 to generate electric power via alternator 216. Spent fluid 220 enters condenser 234. Cold working fluid 232 is conveyed by pump 230 to condenser 234. Condenser 234 heats cold working fluid 232 to form hot working fluid 224 and cools spent fluid 220 to form cool fluid 238. Hot working fluid 224 passes into geothermal cooling system 226 disposed within reservoir 228. Cool fluid 238 is conveyed by pump 236 to regenerator 222 to form liquid flow 242. Liquid flow 242 enters evaporator 210.

Figure 10:
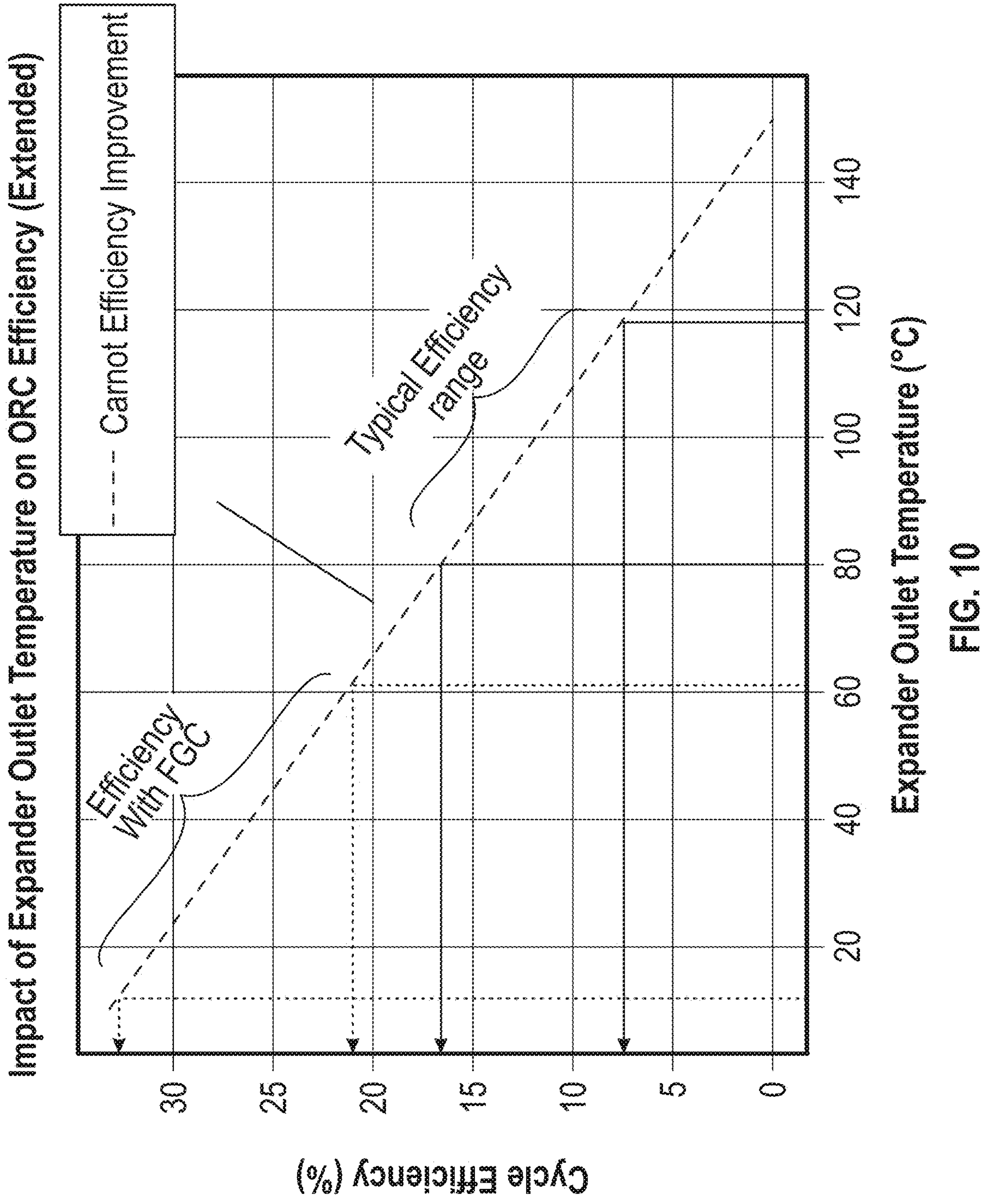
FIG. 10 is a graph that illustrates the impact of expander outlet temperature on ORC efficiency, according to an embodiment of the invention.

FIG. 10 shows the impact of expander outlet temperature on ORC efficiency. The geothermal cooling system allows the expander outlet temperature to be at 60° C. compared to the typical expander outlet temperature of between 80° C. and about 120° C.

Figure 11:
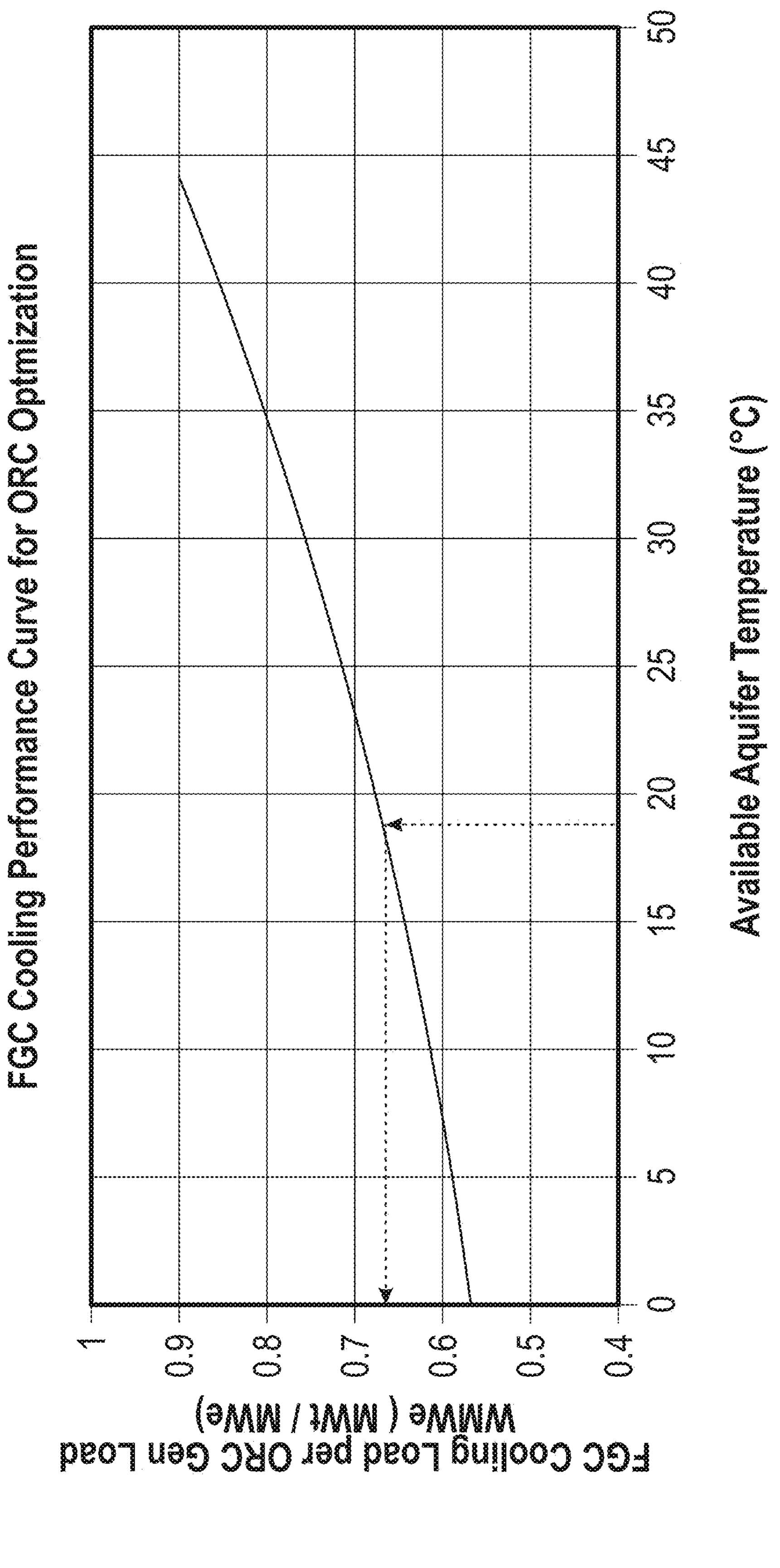
FIG. 11 is a graph that illustrates an FGC cooling performance curve for ORC optimization, according to an embodiment of the invention.

FIG. 11 shows an FGC cooling performance curve for ORC optimization. The curve is based on a single stage ORC with butane as working fluid. Increasing the FGC load to the process allows the condenser to operate at lower temperatures. This allows the expander outlet pressure to be lowered increasing the generation output for the same geothermal recovery performance (i.e., enhanced geothermal system thermal recovery load remains constant). As FGC condenser temperatures are lowered, generation output increases requiring a higher absolute cooling capacity. However, on a relative basis the FGC load per MWe reduces with diminishing benefits. Each working fluid will yield different performance characteristics and selection of the fluid needs to optimize the performance of the FGC for ORC and/or refrigeration service. In addition to working fluid, the working pressures for the ORC system may also be optimized leveraging the FGC cooling utility to further optimize recovery. This allows the parasitic load costs for circulation to be reduced. In addition, the lower pressures allow the geothermal system to achieve lower injection temperatures further improving geothermal production, resource longevity, and allows lower quality geothermal resources to be viable for power production.

Figure 12:
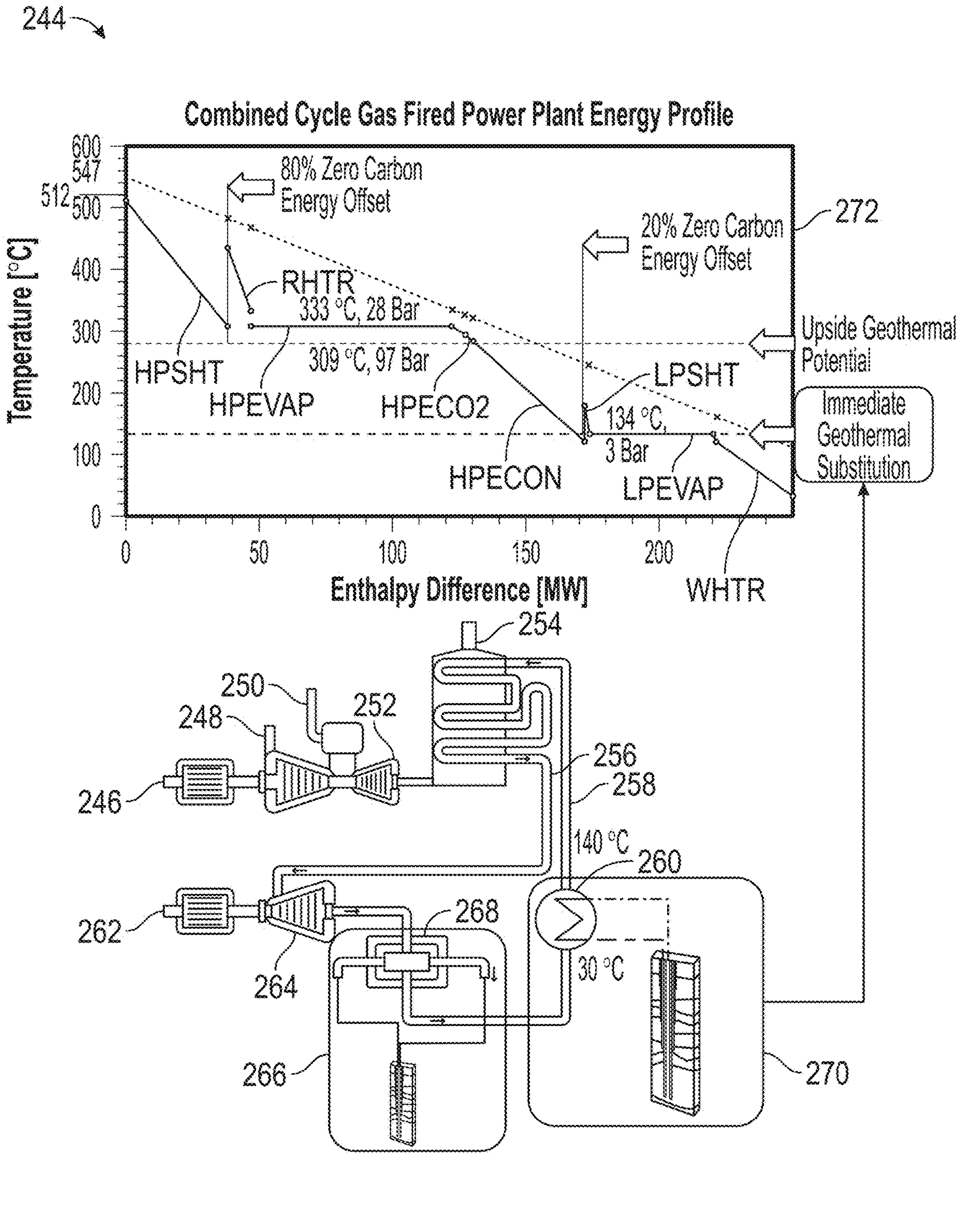
FIG. 12 is a graph and diagram that illustrate the impact of a geothermal cooling system in a combined cycled thermal loop, according to an embodiment of the invention.

FIG. 12 shows the impact of geothermal cooling system 266 and geothermal heating system 270 in combined cycled thermal loop 244. Air and fuel enter gas turbine 252 via air inlet 248 and fuel inlet 250 to combust and power generator 246. Excess heat enters boiler 254 to heat fluid (e.g., water vapor) stream 256. Fluid stream 256 enters turbine 264 to power generator 262. Spent fluid from turbine 264 enters condenser 268 where it is cooled and condensed by a cold working fluid from geothermal cooling system 266. Condenser 268 converts the spent fluid into a liquid that is heated into gas 258 by evaporator 260 using heat from geothermal heating system 270. Gas 258 is conveyed to boiler 254. The energy profile for a combined cycle power plant suing cooling from geothermal cooling system 266 is shown by graph 272.

Figure 13:
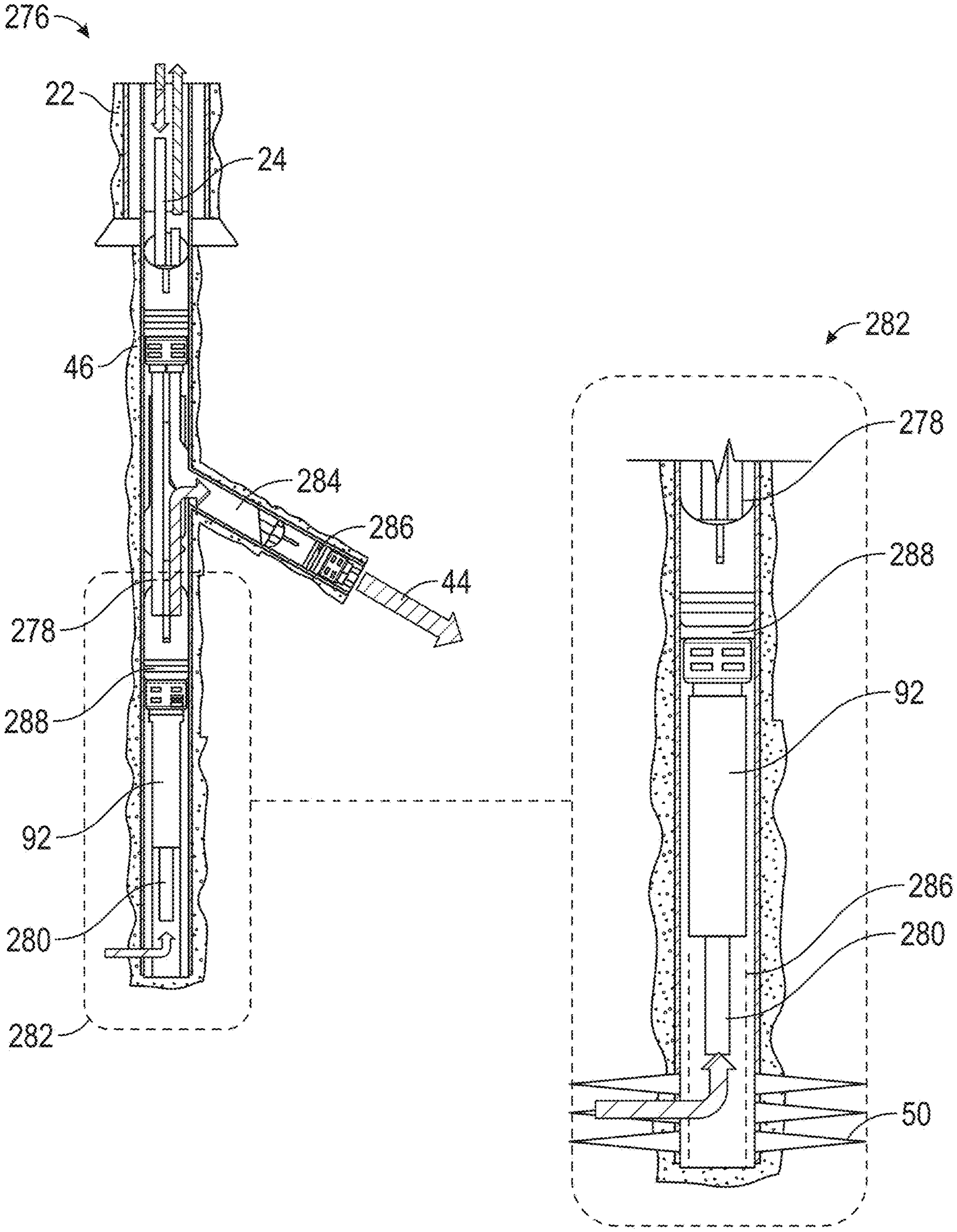
FIG. 13 is a series of diagrams that illustrate a geothermal cooling system comprising a multilateral set FGC comprising lower and lateral pumps, according to an embodiment of the invention.

FIG. 13 shows geothermal cooling system 276 comprising a multilateral set FGC comprising lower pump 280, set in place with pumps 286 and 288, each comprising conduits 278, to establish the required flow path from the aquifer to lower pump 280, through the WBGHX 92, before being reinjected at the toe of multilateral channel 284. Geothermal cooling system 276 may also comprise of slotted production liner, gravel packs, or open hole, as reservoir integrity properties may require insulated tubing 24, multilateral channel 284, and WBGHX system 282 comprising WBGHX 92.

Figure 14:
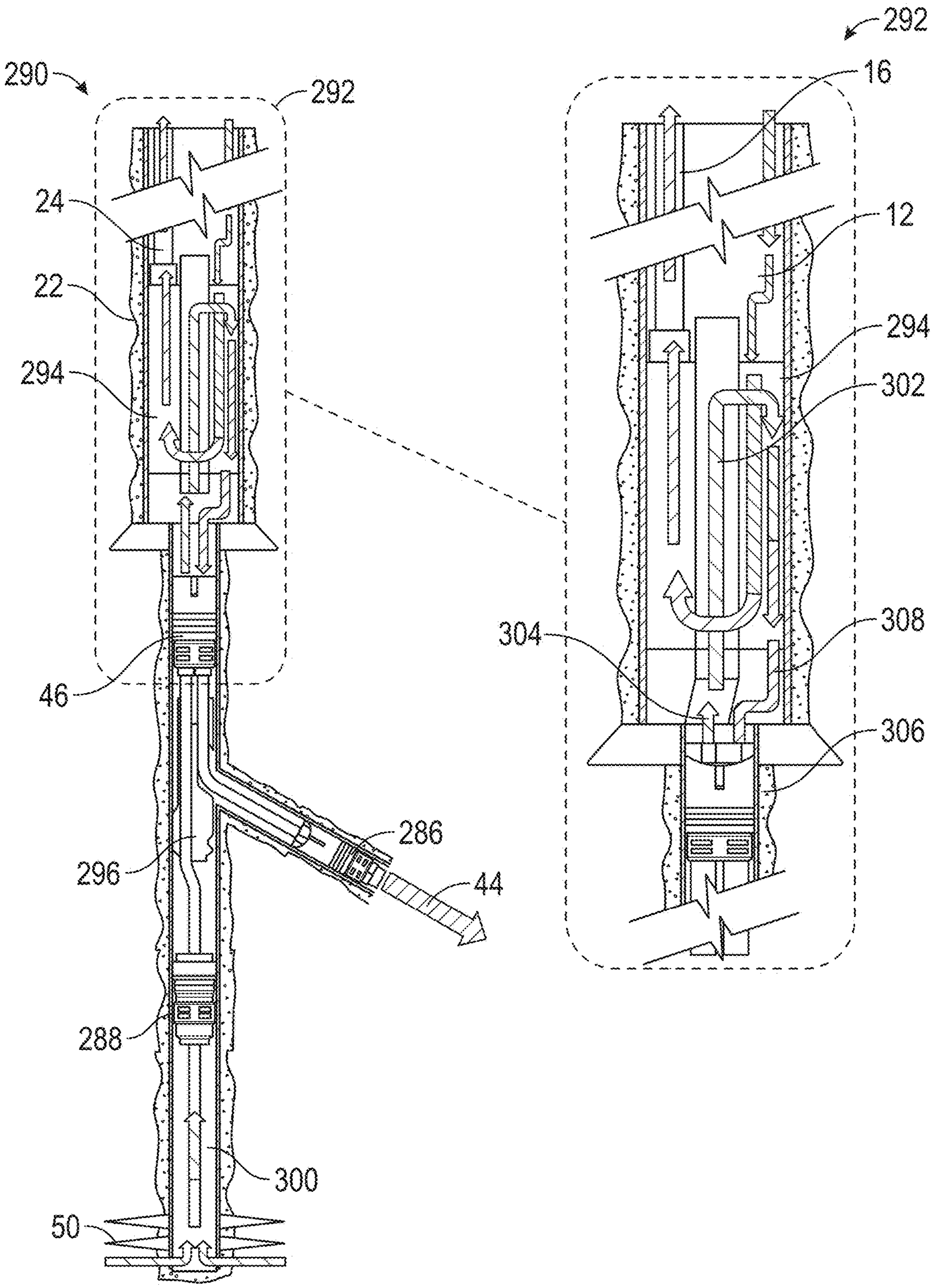
FIG. 14 is a series of diagrams that illustrate a geothermal cooling system comprising a production set FGC comprising lower and lateral pumps, according to an embodiment of the invention.

FIG. 14 shows geothermal cooling system 290 comprising a compact high performance heat exchanger, typically TPMS gyroid or other configurations, 294 and electrical submersible pump 302. Geothermal cooling system 290 also comprises well bore casing 22, insulated tubing 24, multilateral packers 296, pump 288, pump inlet tubing 300, to minimize short circuiting from ESP inlet to injection point, toe perforations 50, WBGHX system 292 comprising TPMS gyroid or other configurations 294, ESP 302 surface loop working fluid, to transport enthalpy from the surface to the surrounding reservoir, cold surface closed loop 16, WBGHX inlet flow geometry diverter to convert core to axial and axial to core flow channels 304 and WBGHX packer 306. Hot surface closed loop 12 provides hot working fluid into WBGHX system 292 to produce cold working fluid and form reservoir return stream 308 which exits geothermal cooling system 290 as warm reservoir fluid 44.

Figure 15:
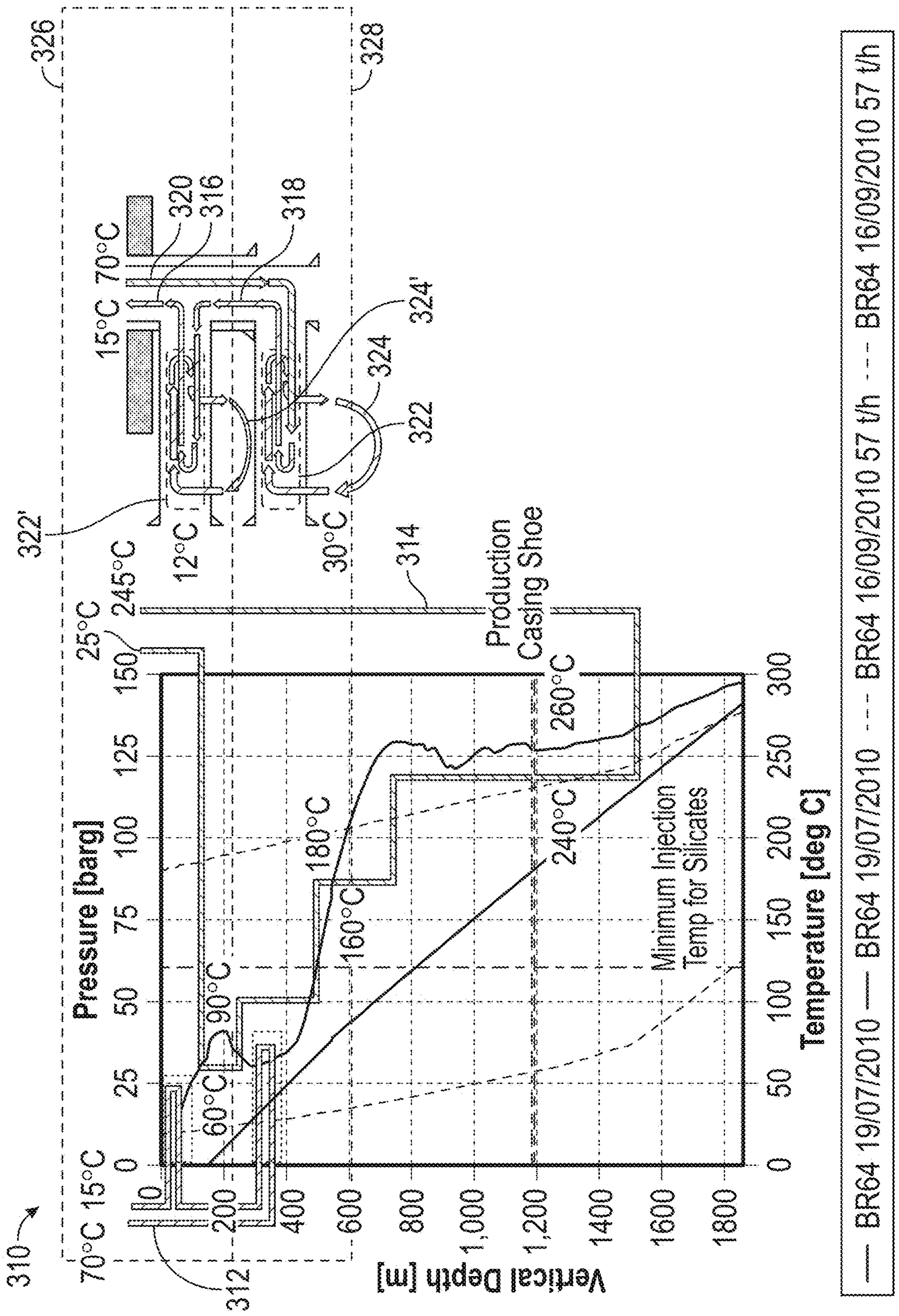
FIG. 15 is a graph and diagram that illustrate the flowing temperature and pressure for a multilateral closed loop geothermal cooling system, according to an embodiment of the invention.

FIG. 15 shows the flowing temperature and pressure for multilateral closed loop 310 for a geothermal cooling system. Cooling closed loop 312 and heating closed loop 314 show the depths required to achieve geothermal cooling and heating, respectively. The depth required for geothermal cooling is shallower than the depth required for geothermal heating. Multilateral cooling zones 326 and 328 show stacked cooling. Hot working fluid 320 (70° C.) enters geothermal cooling system multilateral 322 where it is cooled by reservoir fluid 324 (30° C.) to form cooled working fluid 318 (40° C.). Cooled working fluid 318 (40° C.) enters geothermal cooling system multilateral 322' where it is cooled by reservoir fluid 324' (15° C.) to form cold working fluid 316 (15° C.).

Figure 16:
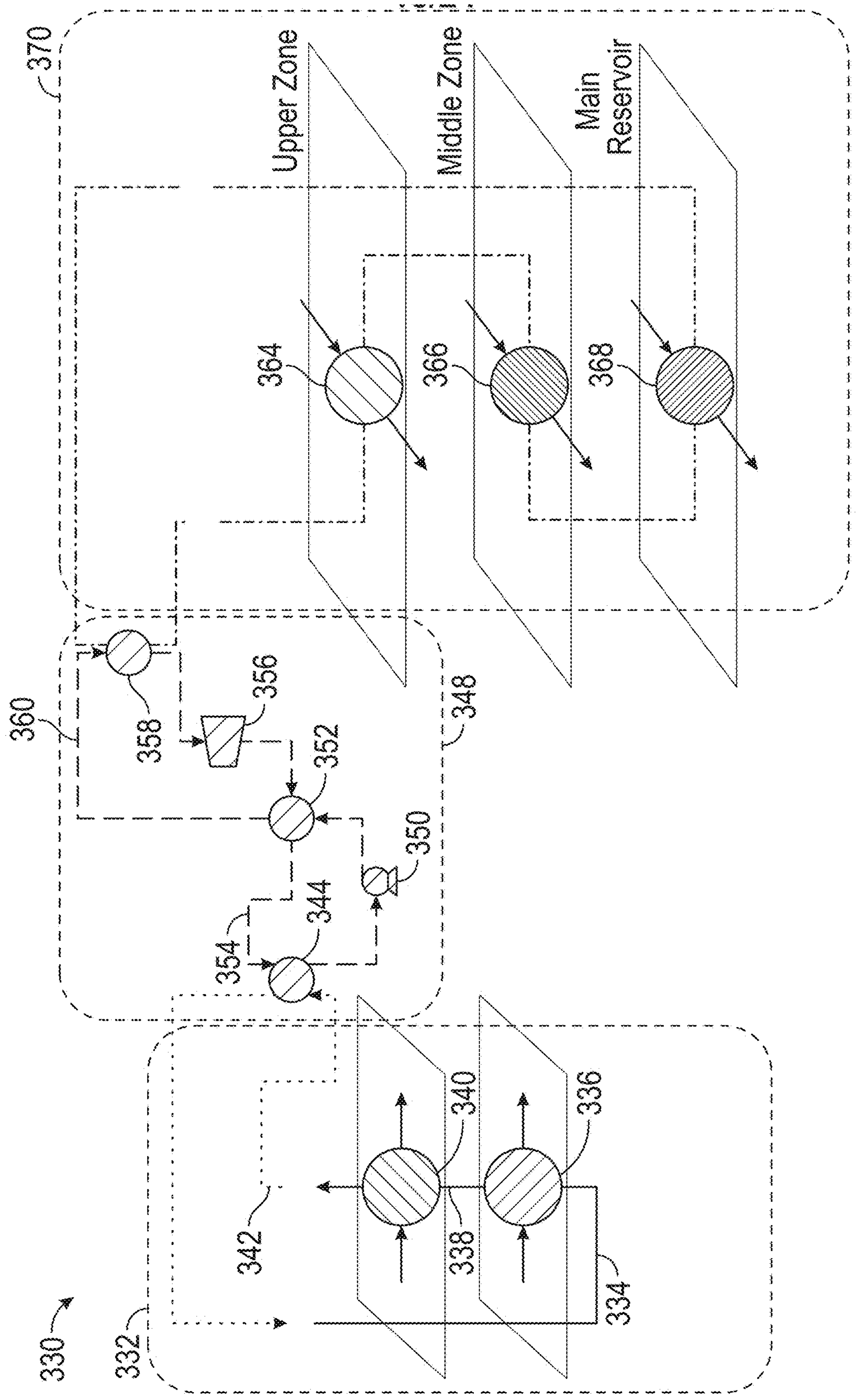
FIG. 16 is a diagram that illustrates a stack loop recovery process using a geothermal cooling system, according to an embodiment of the invention.

FIG. 16 shows stack loop recovery process 330 using geothermal cooling system 332. Hot working fluid flow 334 enters stacked heat exchanger 336 to produce first cold working fluid 338. First cold working fluid 338 enters stacked heat exchanger 340 to produce second cold working fluid 342. Second cold working fluid 342 is at a lower temperature than first cold working fluid 338. Second cold working fluid 342 enters heat exchanger 344 of ORC 348 to cool fluid flow 354. Fluid flow 354 is conveyed via pump 350 to regenerator 352 to form liquid flow 360. Liquid flow 360 enters evaporator 358 to form a gas to power turbine 356. Spent gas from turbine 356 enters regenerator 352. Liquid flow 360 is heated by geothermal heating system 370. Working fluid in geothermal heating system 370 is sequentially heated to higher temperatures by heat exchangers 364, 366, and 368 before returning to evaporator 358. Heating and cooling multilateral wells result in greater enthalpy recovery and rejection on cooling. 100% enthalpy recovery on heat 50% increase on ORC energy recovery from geothermal cooling 100% may be achieved. Electrical load for utility cooling may be offloaded. Stack loop recovery process 330 may be optimized for a given geothermal resource to reduce infill drilling and extend well life from at least about 5 years to about 30 years.

Figure 17:
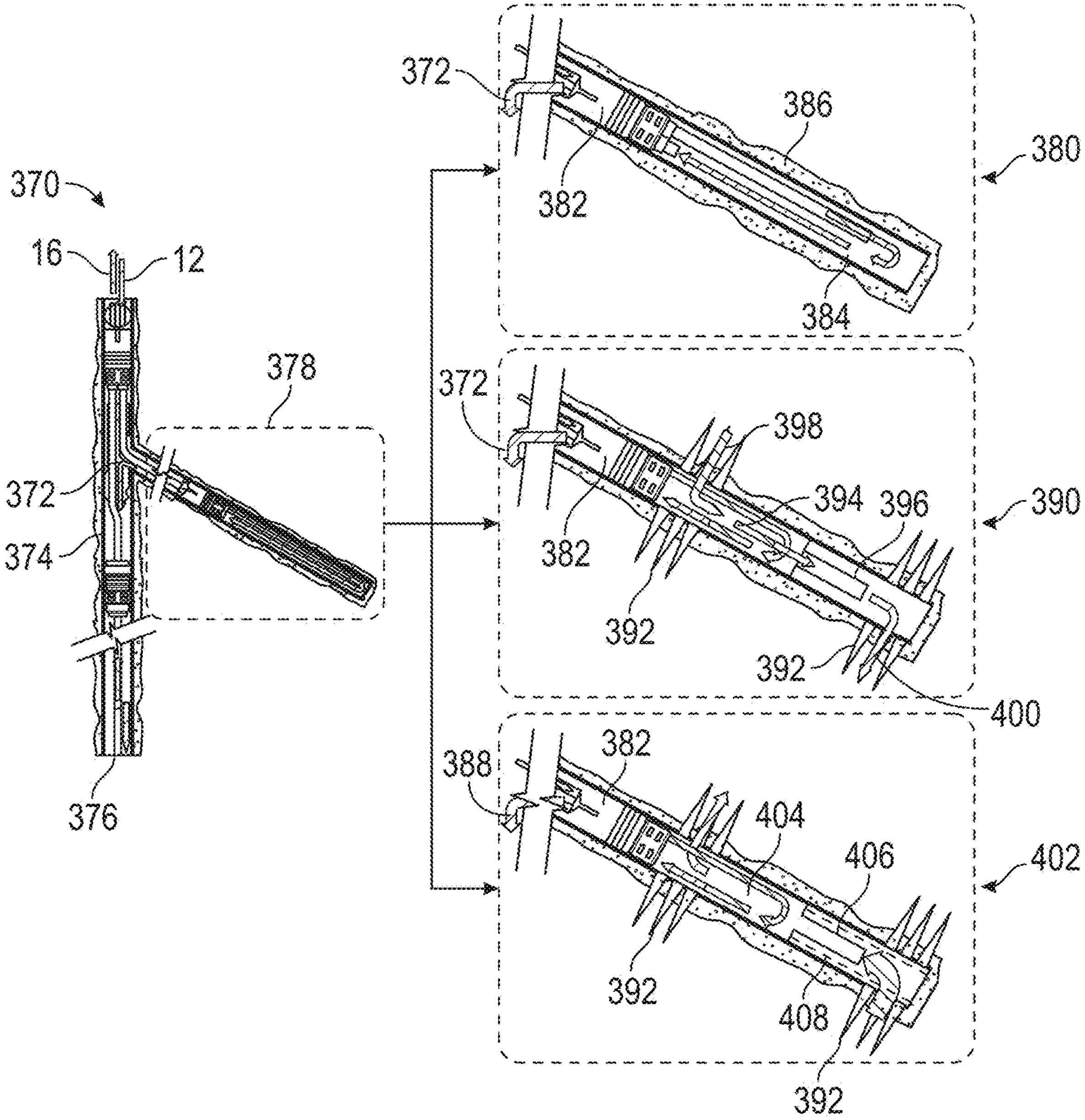
FIG. 17 is a diagram that illustrates multilateral channel casing designs for a geothermal cooling system, according to an embodiment of the invention.

FIG. 17 shows multilateral channel casing designs 380, 388, and 402 for geothermal heating system 370. Geothermal heating system 370 comprises hot surface closed loop 12, cold surface closed loop 16, well bore 374, well bore 376 proceeding to lower FGC unit in a reservoir, and multilateral channel 378. Multilateral channel 378 recovers energy from upper reservoirs. Multilateral channel 378 may be configured for casing designs 380, 388, and 402 for a passive loop multilateral channel, and active thermosyphon multilateral channel, and a pump-driven multilateral channel, respectively.

Casing designs 380, 388, and 402 allow surface closed loop fluid 372 to pass to and/or from a multilateral channel. Casing design 380 comprises multilateral packer 382, cases and sealed lateral 384, and high thermal conductive cement and/or proppant 386. Casing design 380 is configured to case and seal the reservoir. Multilateral packer 382 and tubing create an annulus core flow pattern. The thermal transfer mechanism is a coaxial pipe-in-pipe surface loop incorporating conduction and induced convection or direct reservoir cross flow. Casing design 380 may be used in shallow reservoir s lacking integrity for enhanced or driven circulation or in hot dry rock zones.

Casing design 390 comprises multilateral packer 382, reservoir inlet 398, perforations 392, WBGHX for thermosiphon 394, insulated tubing 396, and reservoir outlet 400. Casing design 390 is configured to allow reservoir interaction with the WBGHX. Cooled reservoir fluid descends through WBGHX to multilateral toe and returns to the reservoir. The thermal transfer mechanism is WBGHX with multi flow paths for surface loop and reservoir fluid for efficient energy exchange. Casing design 390 may be used in thick upper reservoirs with flat thermal profiles and high permeability not requiring ESP drive for kickoff and/or upper low quality hydrothermal reservoirs with lower well complexity requirements.

Casing design 402 comprises multilateral packer 382, perforations 392, WBGHX 404, ESP 406, and slotted production liner and/or gravel pack 408. Casing design 402 is configured to case and seal the reservoir. Multilateral packer 382 and tubing create an annulus core flow pattern. The thermal transfer mechanism is WBGFHX with multi flow paths for surface loop and reservoir fluid for efficient energy exchange. Integrated ESP drives reservoir fluid for kick off and/or ongoing operation. Casing design 402 may be used in deeper low quality hydrothermal reservoirs with lower permeability and/or hydrothermal reservoir sections with high thermal conductivity.

Figure 18A:
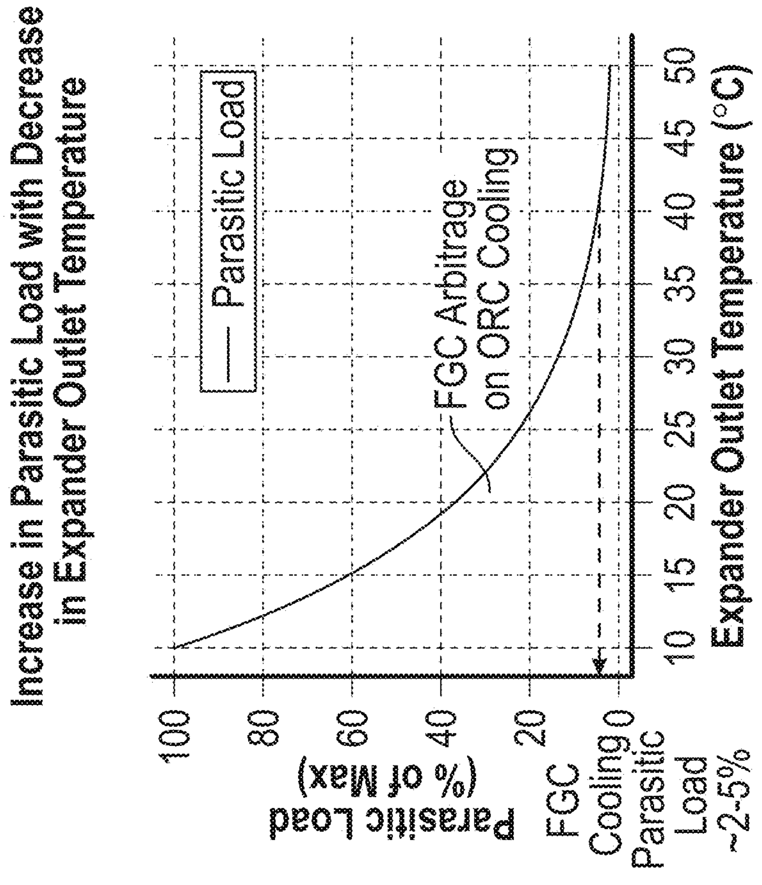
FIG. 18A and FIG. 18B are graphs that illustrate the increase in parasitic load v. expander outlet temperature, and cycle efficiency v. expander outlet temperature, respectively, according to an embodiment of the invention.
Figure 18B:
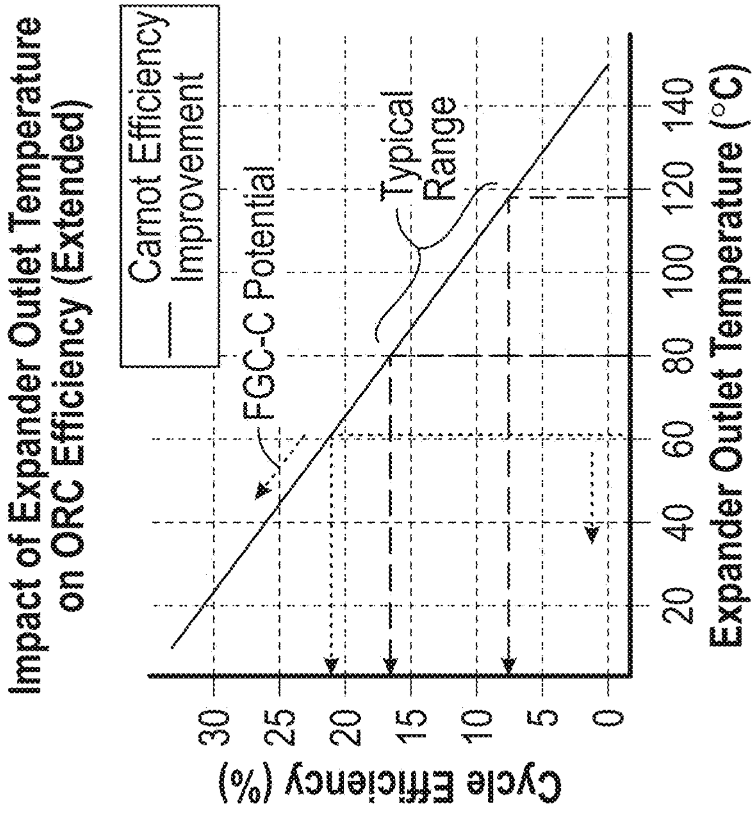

FIGS. 18A and 18B show the increase in parasitic load v. expander outlet temperature, and cycle efficiency v. expander outlet temperature, respectively. FIG. 18A shows that parasitic load increases as the expander outlet temperature decreases. FIG. 18B shows that cycle efficiency increases as expander outlet temperature decreases.

FIGS. 18A and 18B are based on the fracture gradient model. The fracture gradient can be modeled using a nonlinear relationship. The logarithmic model approximation is shown by Equation (2).

$$G(D) = 0.015 + 0.01 + \log10(1 + D) \tag{2}$$

Where:

G(D) is the fracture gradient in mega pascals per meter ("MPa/m"); and

D is depth in meters ("m").

The fracture gradient model assumes that shallow depths (<500 m) are where the gradient starts low, around 0.015 MPa/m; intermediate depths (500 m-3000 m) are where the gradient increases steadily as compaction and lithostatic pressure rise; and deep formations (>3000 m) are where the gradient reaches higher values (around 0.03 to 0.05 MPa/m) but grows more slowly as depth increases, reflecting rock behavior at these depths. The fracture gradient model uses a best fit curve at or less than 1000 m, as shown in Equation (3).

$$G(D) = -2.360\times10^{-9}\cdot D^2 + 1.634\times10^{-5}\cdot D + 0.01889\ G(D) \quad (3)$$

Where:

G(D) is the fracture gradient in MPa/m; and

D Is the Depth in M.

Figure 19:
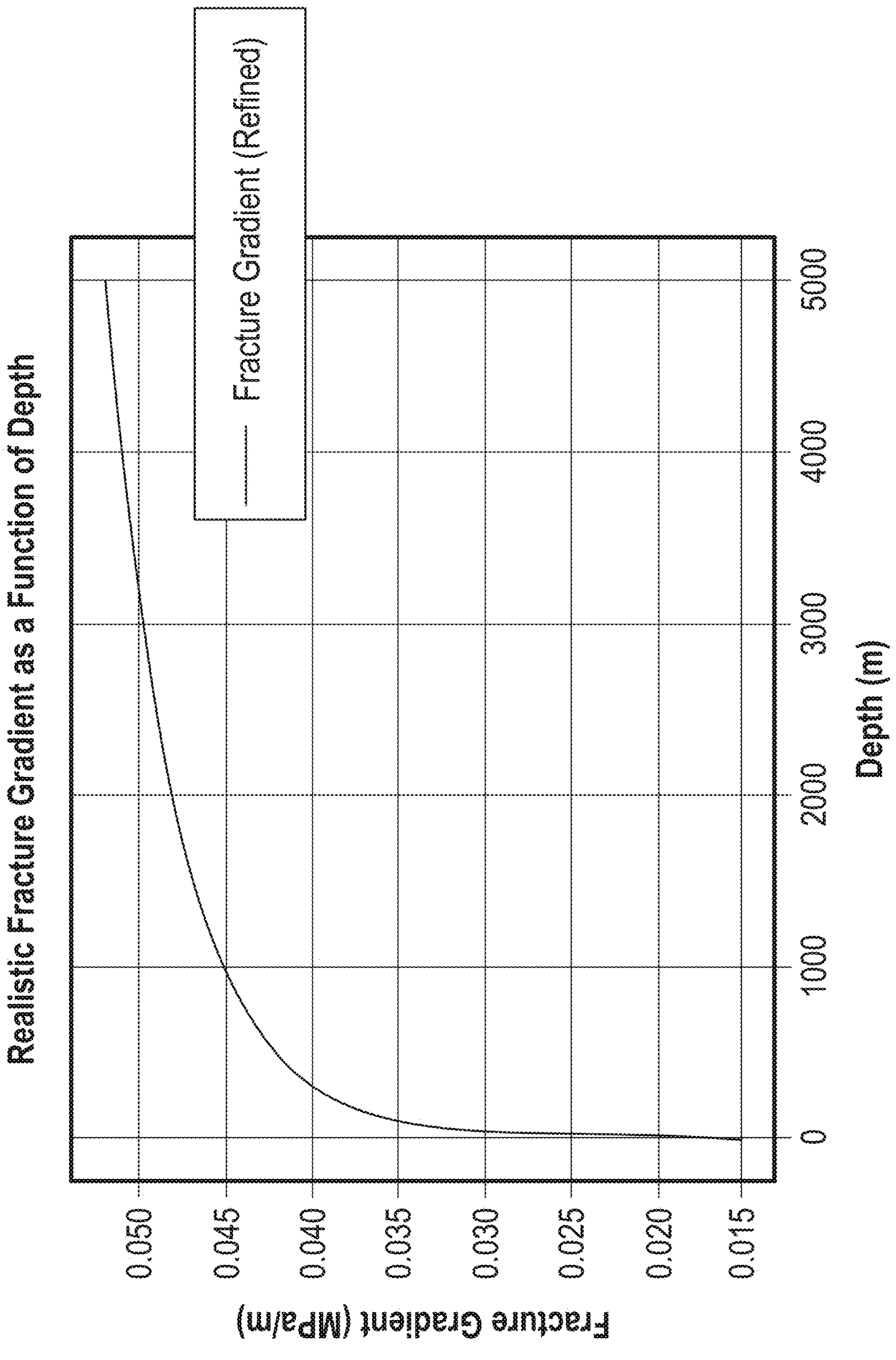
FIG. 19 is a graph that illustrates a realistic fracture gradient as a function of depth, according to an embodiment of the invention.

FIG. 19 shows the realistic fracture gradient, plotted as fracture gradient v. depth. The refined fracture gradient increases sharply below a depth of about 500 m and gradually increases as depth increases above about 1000 m.

Figure 20:
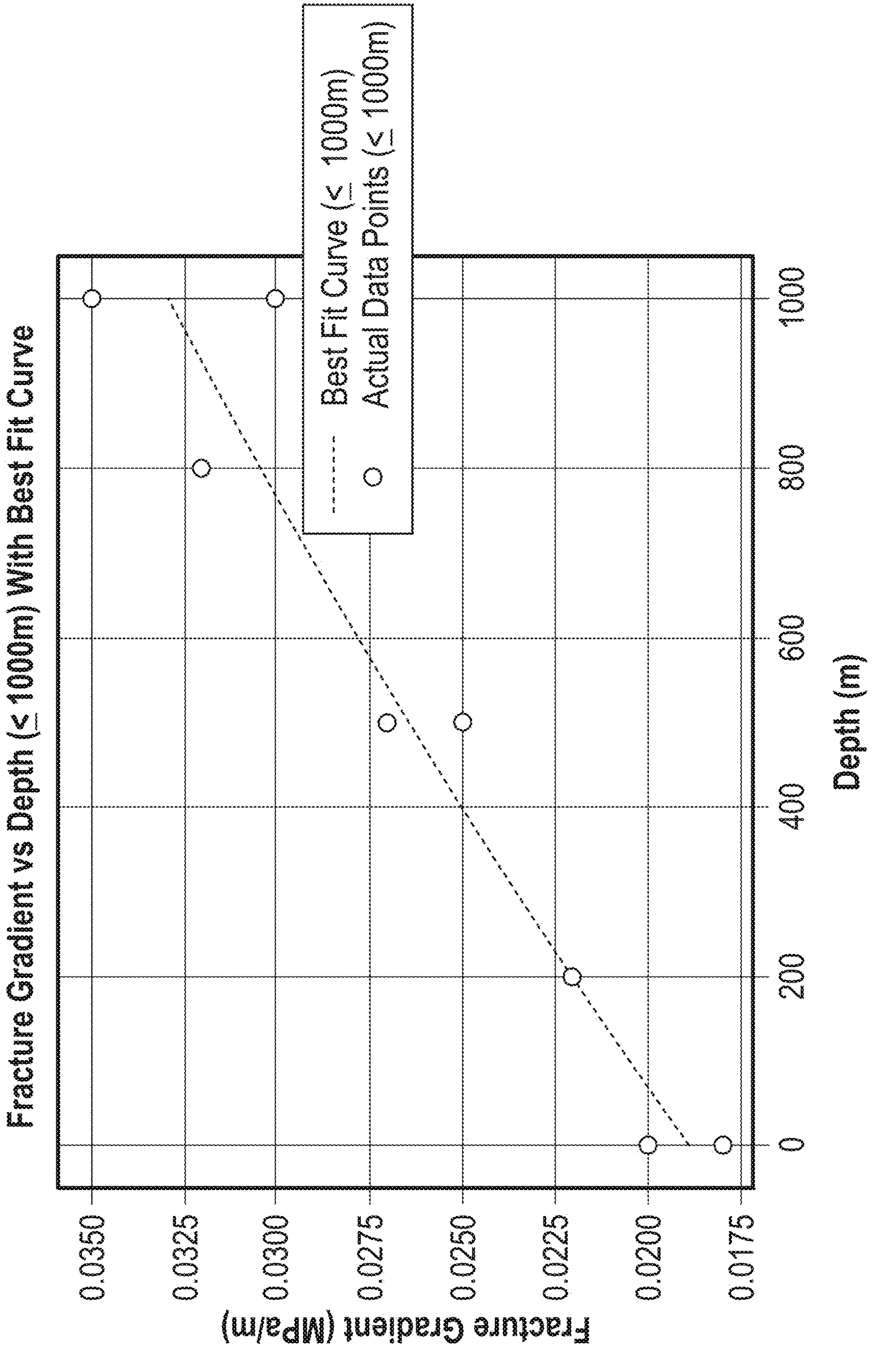
FIG. 20 is a graph that illustrates fracture gradient v. depth with a best fit curve, according to an embodiment of the invention.

FIG. 20 shows fracture gradient v. depth (≤1000 m) with a best fit curve. The facture gradient increases roughly linearly between a depth of 0 m and 1000 m.

Figure 21:
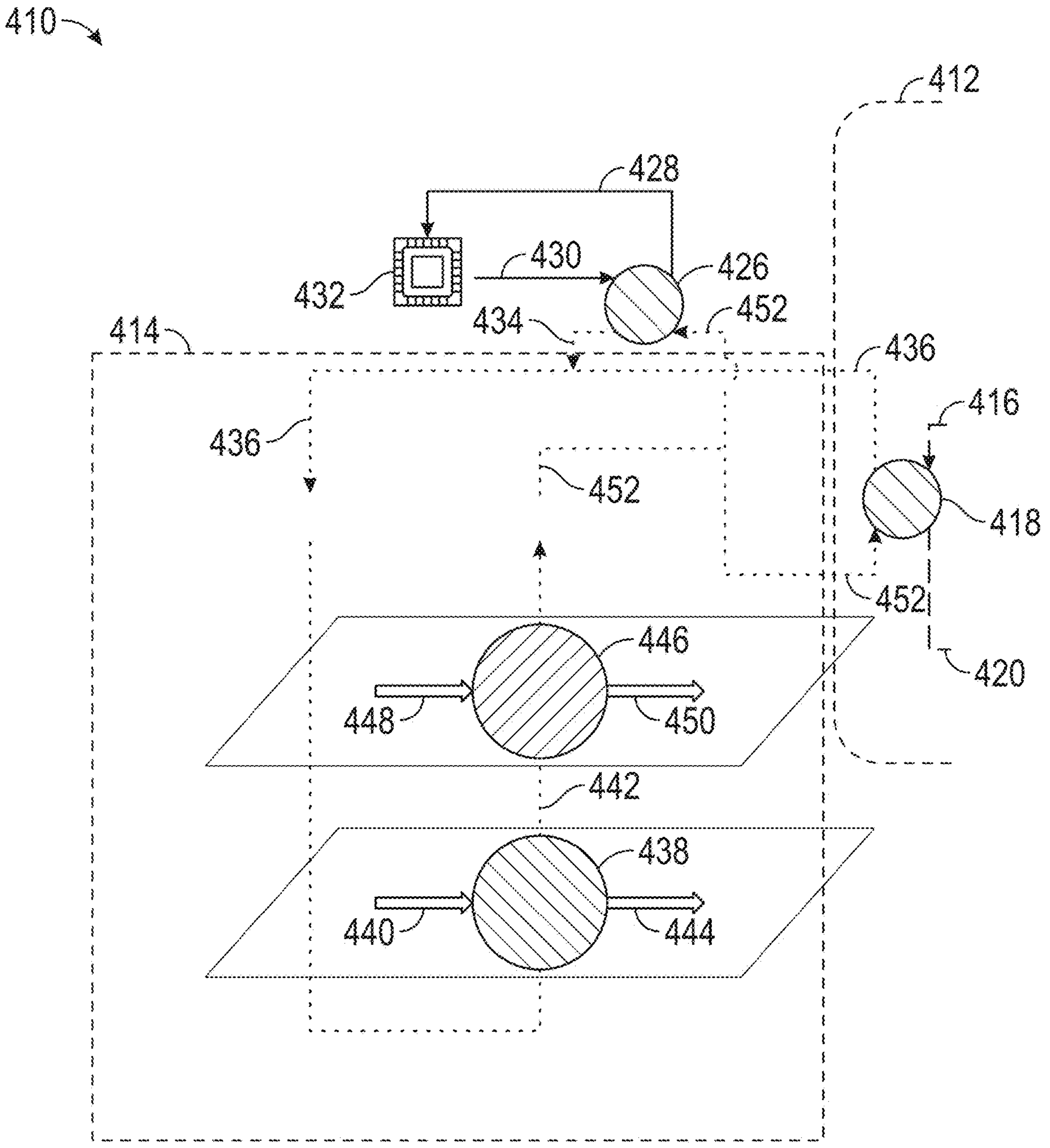
FIG. 21 is a diagram that illustrates a stack loop recovery process using a geothermal cooling system in communication with a data center, according to an embodiment of the invention.

FIG. 21 shows stack loop recovery process 410 using geothermal cooling system 414 in combination with ORC 412. Hot working fluid flow 436 can enter lower reservoir heat exchanger 438 where reservoir fluid 440 is heated to form reservoir fluid 444. Cooled working fluid 442 enters upper reservoir heat exchanger 446 where reservoir fluid 448 is heated to form reservoir fluid 450. Cold working fluid 452 flows into heat exchangers 426 and 418. Heat exchanger 418 is part of an ORC process and cold working fluid 452 is heated by hot working fluid 416. Hot working fluid 416 is cooled to working fluid 420. Heat exchanger 426 receives hot working fluid 430 from data center 432. Cold working fluid 452 cools hot working fluid 430 to produce cooled working fluid 428 which is recycled to data center 432. Cold working fluid 452 is heated by heat exchanger 426 to form heated working fluid 434 that is returned to hot working fluid flow 436. Optionally, hot working fluid flow 436 may be cooled by a single heat exchanger.

Figure 22:
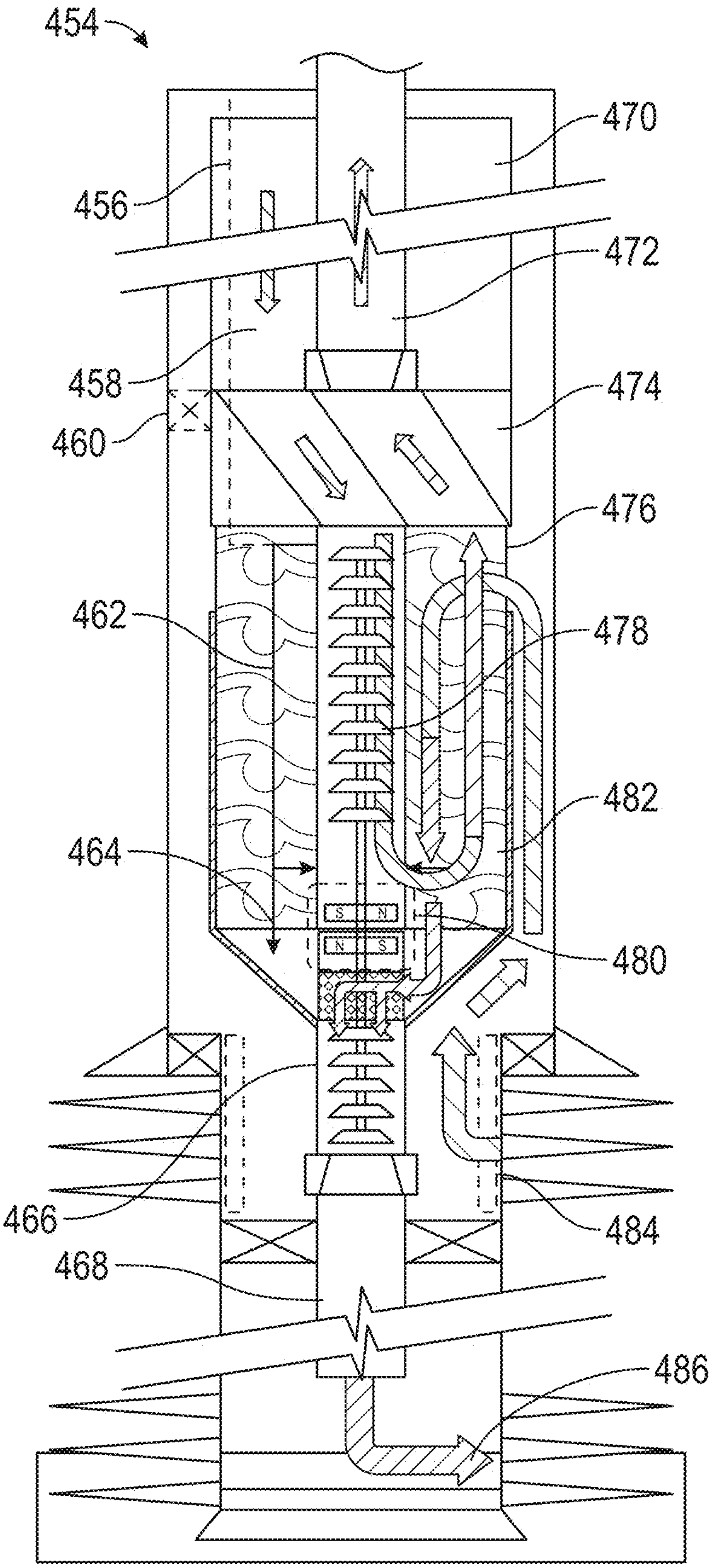
FIG. 22 is a diagram that illustrates a geothermal cooling system comprising a hydraulic driver with a working fluid, according to an embodiment of the invention.

FIG. 22 shows geothermal cooling system 454 comprising surface control umbilical 456, surface loop working fluid 458, production casing 460, hydraulic pump bypass port 462, hydraulic pump reservoir reject port 464, lower FGC pump assembly 466, lower FGC tubing 468, injection perforations 486, slotted liner 484, WBGHX 482, hydraulic pump cooling and thrust bearing assembly 480, hydraulic motor 478, reservoir intake 476, in-line flux cross over connection 474, insulated tubing 472, and surface loop casing 470. Surface control umbilical 456 maintains pump speed, torque, and/or reservoir injection. Surface loop working fluid 458 circulates to transport thermal energy as well as provide hydraulic driving force in place of an electrical submersible pump. Production casing 460 fixes the WBGHX to the surface. A hydraulic pump bypass port controls lower FGC pump assembly 466 or compressor assembly to maintain target speed and torque. Hydraulic pump reservoir reject port 464 for the working fluid assists with reservoir pressure and convection cycle mass flow. Where the working fluid is $CO_2$, the discharge port allows the FGC well to provide function as a carbon sequestration asset. The $CO_2$ enhances reservoir convection, including with dry rock geology, and expands the operating envelop for the FGC system. Water makeup may also be provided to the reservoir to assist with ESP startup and/or to assist with reservoir pressure maintenance. Lower FGC pump assembly 466 generates the reservoir convection circuit. Optionally, lower FGC pump assembly 466 is a pump for hydraulic systems or a compressor for dry rock geology. Lower FGC tubing 468 reduces short circuiting of the reservoir fluid and to generate thermosiphon effects to minimize injection energy requirements. Injection perforations 486 allow reservoir fluid to be returned to the reservoir. The direction may be toe-to-heal or heal-to-toe depending on design requirements. Slotted liner 484 allows inflow and maintains reservoir integrity. Optionally, slotted liner 484 may be replaced with a gravel pack, or open hole, depending on well bore requirements. Hydraulic pump cooling and thrust bearing assembly 480 transfer power to the pump or compressor subassembly to drive the forced geothermal convection in the reservoir. Coupling may take the form of magnetic, hydraulic, or mechanical mechanism transform the shaft power to match required rotation speed and torque needs. Hydraulic motor 478 is powered by the surface loop working fluid to drive a pump or compressor subassembly on WBGHX 482. Reservoir intake 476 is connected to WBGHX 482. WBGHX 482 is connected via casing thread to the upper loop casing. A packer can be used to provide additional support for landing to WBGHX 482. Insulated tubing 472 returns working medium to the surface. The insulation may be a vacuum or closed cell insulation. Surface loop casing 470 is used for low-loss higher pressure circulation of working fluid.

The geothermal cooling system may comprise an FGC. The FGC may comprise a heat exchanger, hot surface cold loop, cold surface closed loop, and a reservoir return channel.

The geothermal cooling system may comprise a well bore. The well bore may comprise a vertical or surface deviated well section. The well bore may comprise a reservoir intake or an intake perforation. The well bore may be disposed at any angle relative to a surface. The reservoir intake may receive cold reservoir fluid and be a cold reservoir fluid intake.

The geothermal cooling system may comprise a pump. The pump may comprise a submersible pump, an electric pump, a pneumatic pump, a rotary pump, or a combination thereof.

The geothermal cooling system may comprise tubing. The tubing may be in communication with a heat exchanger. The tubing may be insulated and may be insulated by surrounding vacuum.

The geothermal cooling system may comprise a heat exchanger. The heat exchanger may be a well bore heat exchanger or a well bore gyroid heat exchanger ("WBGHX"). The heat exchanger may comprise a channel and/or cavity to receive a fluid. The heat exchanger may comprise a triple propagating minimal structure.

The geothermal cooling system may comprise a fluid. The fluid may include, but is not limited to, water, an organic fluid, an oil, a hydrocarbon, carbon dioxide, ethanol, an alcohol, a fluid with a vaporization temperature lower than water, or a combination thereof. The fluid may be a reservoir fluid and/or working fluid. The fluid may exist at any temperature or pressure.

The geothermal cooling system may comprise a thermosiphon. The thermosiphon may be in communication with a pump.

The geothermal cooling system may comprise a reservoir return channel. The reservoir return channel may be a multilateral channel, e.g., one or more lateral channel offshoots from a well bore. The reservoir return channel may comprise a packer, a casing, cement, a proppant, tubing, an inlet, exchanger, a liner, a thermosiphon, or a combination thereof.

The geothermal cooling system may comprise a landing packer. The landing packer may stabilize a section of the geothermal cooling system. The geothermal cooling system may comprise a liner. The liner may be a slotted liner and/or production liner. The geothermal cooling system may comprise a gravel pack.

The geothermal cooling system may be used in combination with a system or process using an ORC. The geothermal cooling system may be in communication with a condenser. The condenser may be a component of a cooling system.

The geothermal cooling system may be used in combination with a system or process using a combined cycle thermal loop. The geothermal cooling system may be in communication with a condenser receiving an input form a steam turbine or refrigeration compressor.

The geothermal cooling system may be used in combination with a data center. The geothermal cooling system may receive heat from any portion of the data center via a working fluid and exchanger or via the working fluid directly. The working fluid may be in communication with or in proximity to any portion of the data center. The data center may comprise information technology, power supply, and processor components. Any component of the geothermal cooling system (e.g., heat exchanger, well bore, thermophone) may be in communication with the data center.

The geothermal cooling system may be used in combination with an industrial system. The geothermal cooling system may receive heat from any portion of the industrial system via a working fluid and exchanger or via the working fluid directly. The working fluid may be in communication with or in proximity to any portion of the industrial system. Any component of the geothermal cooling system (e.g., heat exchanger, well bore, thermophone) may be in communication with the industrial system.

The geothermal cooling system may comprise a hydraulic driver that is situated within, above, or below the WBGHX. The hydraulic driver may be driven by a working medium. A high-mechanical-integrity seal may be present between the surface loop and the WBGHX. The WBGHX may be set on its own casing that is installed within the production casing to form the high-mechanical-integrity seal. The hydraulic drive may reject the working fluid into the WBGHX where it exchanges thermal energy with the circulated reservoir medium. The hydraulic drive may be coupled with a lower assembly pump or compressor section. The coupling may take the form of a mechanical coupler with seals, a hydraulic system, and/or a magnetic coupling if a high-mechanical-integrity seal is required.

The coupling mechanism may be a direct drive or geared depending on the requirements of the system. The geothermal cooling system may operate in either direction depending on the reservoir characteristics and to take advantage of the geothermal gradient for greater energy transfer and minimal parasitic load for reinjection.

The geothermal cooling system may be made from, or comprise components made from, additive manufacturing. The additive manufacturing may include, but is not limited to, three dimensional printing. Materials may be used to additively manufacture the geothermal cooling system including, but not limited to, steel, nickel, chromium, alloys and/or superalloys thereof, or a combination thereof.

The geothermal cooling system may a secondary cooling system. The secondary cooling system may be in communication with the hot surface closed loop and/or cold surface closed loop of the geothermal cooling system. The secondary cooling system may comprise a secondary hot surface closed loop and secondary cold surface closed loop, insulated tubing, a heat exchanger, a working fluid, and a pump. The heat exchanger may be a well bore heat exchanger and/or WBGHX. The secondary hot surface closed loop and/or secondary cold surface closed loop may be at least partially disposed within insulated tubing. The secondary hot surface closed loop and/or secondary cold surface closed loop may be in communication with a server or any other component of a data center. The hot secondary surface closed loop may be in communication with a heat exchanger or may be in communication or the hot surface closed loop of the geothermal cooling system. The secondary cold surface closed loop may be in communication with the cold surface closed loop of the geothermal cooling system.

Heat from the server or any other component of a data center may be received by the secondary hot surface closed loop. The secondary hot surface loop may convey secondary hot working fluid to a heat exchanger where the secondary hot working fluid may transfer heat to reservoir fluid or cold working fluid to form secondary cold working fluid. The secondary cold working fluid may be transported back to the server or any other component of a data center via secondary cold surface loop.

Alternatively the secondary hot working fluid may be mixed and/or combined with hot working fluid in a hot surface closed loop for transport to a well bore heat exchanger and/or WBGHX. The combined hot working fluid may be cooled by the well bore heat exchanger and/or WBGHX by exchanging heat with reservoir fluid to form a combined cold working fluid. The combined cold working fluid may be transported back to the server or any other component of a data center via secondary cold surface loop.

Embodiments of the present invention provide a technology-based solution that overcomes existing problems with the current state of the art in a technical way to satisfy an existing problem for data centers and/or geothermal producers. Embodiments of the present invention achieve important benefits over the current state of the art, such as increased thermodynamic and/or economic efficiency for data centers and/or geothermal systems via cooling a working fluid. Some of the unconventional steps of embodiments of the present invention include a forced geothermal circuit configured to cool a fluid from a data center and/or an organic Rankine cycle.

The term of degree "substantially" as used herein means a reasonable amount of deviation of the modified term such that the end result is not significantly changed. Note that in the specification and claims, "about" or "approximately" means within twenty percent (20%) of the numerical amount cited. The terms, "a", "an", "the", and "said" mean "one or more" unless context explicitly dictates otherwise. The term "and/or" as used herein means that the listed items are present, or used, individually or in combination. In effect, this term means that "at least one of" or "one or more" of the listed items is present or used.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and this application is intended to cover, in the appended claims, all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for geothermal cooling, the method comprising:

passing a hot working fluid into a forced geothermal circuit comprising a well bore heat exchanger;

passing a cold reservoir fluid from a reservoir through an intake;

passing the cold reservoir fluid into the well bore heat exchanger;

reducing the temperature of the hot working fluid to form a cold working fluid;

increasing the temperature of the cold reservoir fluid to form warm reservoir fluid;

passing the cold working fluid into a cold surface closed loop;

passing the warm reservoir fluid into a reservoir return channel; and passing the cold reservoir fluid through a thermosyphon wherein the thermosyphon is disposed below the well bore heat exchanger.

2. The method of claim 1 further comprising passing the warm reservoir fluid into the reservoir.

3. The method of claim 1 further comprising conveying the hot working fluid and cold working fluid by thermosyphon effect.

4. The method of claim 1 wherein the hot working fluid is passed from into the forced geothermal circuit comprising a well bore heat exchanger from an industrial application.

5. The method of claim 4 wherein the industrial application is a data center.

6. The method of claim 4 wherein the industrial application is an organic Rankine cycle.

7. The method of claim 1 wherein the cold reservoir fluid from a reservoir is passed through an intake by a pump.

8. The method of claim 1 wherein the well bore heat exchanger is a well bore gyroid heat exchanger.

9. The method of claim 1 wherein the thermosyphon provides reservoir drawdown of the cold reservoir fluid.

10. The method of claim 1 wherein the thermosyphon provides cross flow of the cold reservoir fluid.

11. The method of claim 1 wherein the well bore heat exchanger comprises a triple propagating structure.

12. The method of claim 11 further comprising passing the cold reservoir fluid through a triple propagating structure.

13. The method of claim 11 further comprising passing the hot working fluid through a triple propagating structure.

14. The method of claim 11 wherein the triple propagating structure comprises a matrix.

15. The method of claim 1 further comprising passing the cold reservoir fluid through a perforation intake.

16. The method of claim 15 wherein the perforation intake is disposed below the well bore heat exchanger.

17. The method of claim 1 further comprising passing the warm reservoir fluid out of an exit channel.

18. The method of claim 17 further comprising a multilateral return in communication with the exit channel.

* * * * *